(12) United States Patent
Reddy et al.

(10) Patent No.: US 7,814,582 B2
(45) Date of Patent: Oct. 19, 2010

(54) SYSTEM AND METHOD FOR MEASURING AND MONITORING OVERFLOW OR WETNESS CONDITIONS IN A WASHROOM

(75) Inventors: Kiran K. Reddy, Roswell, GA (US);
Joseph Mitchell, Alpharetta, GA (US);
Cheryl L. York, Canton, GA (US);
Amanda Butler, Woodstock, GA (US);
Debra N. Welchel, Woodstock, GA (US); Rameshbabu Boga, Roswell, GA (US); James J. Detamore, Atlanta, GA (US); Ronald R. Padak, Suwanee, GA (US); Jason Lye, Atlanta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 959 days.

(21) Appl. No.: 11/170,734

(22) Filed: Jun. 29, 2005

(65) Prior Publication Data

US 2006/0005312 A1 Jan. 12, 2006

Related U.S. Application Data

(63) Continuation-in-part of application No. 11/015,346, filed on Dec. 17, 2004, and a continuation-in-part of application No. 10/750,238, filed on Dec. 31, 2003, now Pat. No. 7,726,599.

(51) Int. Cl.
*E03D 5/10* (2006.01)
(52) U.S. Cl. .................... 4/302; 4/313; 4/427; 4/623; 4/DIG. 3

(58) Field of Classification Search ............. 4/427, 4/623, 664, DIG. 3, 302–305, 313; 340/616
See application file for complete search history.

(56) References Cited

U.S. PATENT DOCUMENTS 4,514,631 A 4/1985 Guscott (Continued)

FOREIGN PATENT DOCUMENTS

CA 2269483 A1 10/2000

(Continued)

OTHER PUBLICATIONS

"Microprocessor Restrooom Robot", Claude A. Wiatrowski, Computer Design, vol. 16, No. 4, Apr. 1977, pp. 98-100.*

(Continued)

*Primary Examiner*—Robert M Fetsuga
(74) *Attorney, Agent, or Firm*—Dority & Manning, P.A.

(57) ABSTRACT

A system for detecting an actual or impending overflow condition from a washroom fixture includes an overflow sensor configured with the fixture at a location to detect an abnormal rise in water level within the fixture before water overflows the fixture. A water sensor may also be disposed to detect an abnormal amount of water on the washroom floor. A data communications unit is in communication with the sensors. A washroom monitoring station is provided in wireless communication with the data communications unit and in communication with the sensors through the data communications unit. The washroom monitoring station is configured for indicating the presence of water when detected by the overflow or water sensors.

13 Claims, 14 Drawing Sheets

U.S. PATENT DOCUMENTS

| | | |
|---|---|---|
| 4,596,668 A | 6/1986 | Berbeco |
| 4,800,278 A | 1/1989 | Taniguti et al. |
| 4,872,910 A | 10/1989 | Eshleman et al. |
| 5,198,521 A | 3/1993 | Ehrhart et al. |
| 5,276,595 A | 1/1994 | Patrie |
| 5,361,070 A | 11/1994 | McEwan |
| 5,504,947 A | 4/1996 | Robellop et al. |
| 5,677,927 A | 10/1997 | Fullerton et al. |
| 5,687,169 A | 11/1997 | Fullerton |
| 5,832,035 A | 11/1998 | Fullerton |
| 5,867,843 A | 2/1999 | Robello et al. |
| 5,878,381 A | 3/1999 | Gemmell et al. |
| 6,177,903 B1 | 1/2001 | Fullerton et al. |
| 6,218,979 B1 | 4/2001 | Barnes et al. |
| 6,300,903 B1 | 10/2001 | Richards et al. |
| 6,360,181 B1 | 3/2002 | Gemmell et al. |
| 6,363,057 B1 * | 3/2002 | Ardalan et al. .............. 370/252 |
| 6,411,920 B1 | 6/2002 | McConnell et al. |
| 6,610,367 B2 | 8/2003 | Lewis et al. |
| 6,695,999 B2 | 2/2004 | Kühl et al. |
| 6,810,902 B2 * | 11/2004 | Bootka ....................... 4/427 X |
| 2002/0102385 A1 | 8/2002 | Kuhl et al. |
| 2004/0142163 A1 | 7/2004 | Kuhl et al. |
| 2005/0071914 A1 | 4/2005 | Marshall |
| 2005/0145745 A1 | 7/2005 | Lewis et al. |
| 2005/0171634 A1 | 8/2005 | York et al. |

FOREIGN PATENT DOCUMENTS

| | | |
|---|---|---|
| DE | 19806865 A1 | 8/1999 |
| EP | 0055894 | 7/1982 |
| EP | 1033353 | 9/2000 |
| EP | 1081299 | 3/2001 |
| EP | 1384978 | 1/2004 |

OTHER PUBLICATIONS

English language abstract of EP 1,384,978, Jan. 2004, 1 pg.*
English language abstract of EP 1,081,299, Mar. 2001, 1 pg.*
English language abstract of EP 0,055,894, Jul. 1982, 1 pg.*
English language abstract of EP 1,033,353, Sep. 2000, 1 pg.*
Patent Abstract of Japan No. 59071322, Apr. 23, 1984.
Patent Abstract of Japan No. 58011564, Jan. 22, 1983.
Patent Abstract of Japan No. 61252107, Nov. 10, 1986.
Patent Abstract of Japan No. 62030141, Feb. 9, 1987.
Patent Abstract of Japan No. 62043463, Feb. 25, 1987.
Patent Abstract of Japan No. 62143949, Jun. 27, 1987.
Patent Abstract of Japan No. 11081635, Mar. 26, 1999.
Patent Abstract of Japan No. 2004019438, Jan. 22, 2004.
Patent Abstract of Japan No. 11325486, Nov. 26, 1999.
Patent Abstract of Japan No. 2003247964, Sep. 5, 2003.
Patent Abstract of Japan No. 2004117020, Apr. 15, 2004.
Patent Abstract of Japan No. 2001264163, Sep. 26, 2001.
Patent Abstract of Japan No. 2000041900, Feb. 15, 2000.
Patent Abstract of Japan No. 2000154576, Jun. 6, 2000.
Patent Abstract of Japan No. 8326121, Dec. 10, 1996.
Patent Abstract of Japan No. 9125495, May 13, 1997.
Patent Abstract of Japan No. 8226161, Sep. 3, 1996.
Patent Abstract of Japan No. 5291925, Nov. 5, 1993.
Patent Abstract of Japan No. 4093428, Mar. 26, 1992.
Patent Abstract of Japan No. 8271340, Oct. 18, 1996.
Patent Abstract of Japan No. 1220386, Sep. 4, 1989.
Patent Abstract of Japan No. 9241543, Sep. 16, 1997.
Patent Abstract of Japan No. 2122928, May 10, 1990.
Patent Abstract of Japan No. 61073763, Apr. 15, 1986.
EPO Search Report, US2005/043006, Apr. 18, 2006, 10 pgs.

* cited by examiner

SYSTEM AND METHOD FOR MEASURING AND MONITORING OVERFLOW OR WETNESS CONDITIONS IN A WASHROOM

RELATED APPLICATION

The present application claims priority as a Continuation-In-Part application (CIP) of U.S. patent application Ser. No. 11/015,346 entitled "System and Method for Measuring, Monitoring and Controlling Washroom Dispensers and Products" filed on Dec. 17, 2004, as a Continuation-In-Part (CIP) of U.S. patent application Ser. No. 10/750,238 filed on Dec. 31, 2003 now U.S. Pat. No. 7,726,599, entitled "Dispenser with Electronic Sensing Device to Control Delivered Sheet Length." The application Ser. Nos. 11/015,346 and 10/750,238 are incorporated by reference herein in their entirety for all purposes.

BACKGROUND

Washroom toilet and sink overflows in any type of public building or facility are a major concern in that such a condition may result in closure of the washroom and significant clean-up expense, not to mention the inconvenience to patrons and building tenants. It is a burdensome, time consuming, and often frustrating task for building managers and janitorial/maintenance personnel to police and monitor washroom facilities according to a periodic schedule in hopes of detecting or minimizing damage and down-time from an overflow condition. In a relatively large building facility having a number of public washrooms, significant manpower is needed to monitor all of the facilities. The janitorial and maintenance staff may spend a substantial part of their work day simply patrolling the washroom facilities and, even with a relatively high frequency of visits (i.e., hourly), significant damage can result from intervening and undetected overflow conditions.

It is often the situation where standing water in a washroom facility may accumulate from sources other than an overflowing toilet or sink. For example, a leak or break in a fixture supply line, or a broken or vandalized fixture, may result in such a condition. Standing water on the floor of any public facility, particularly a washroom, creates obvious health and safety concerns. In this regard, although significant effort may be made to prevent of detect impending overflowing conditions from a toilet or sink, water may inevitably accumulate in the washroom, particularly in remote or hidden locations such as around the base of a toilet or under a sink. If left undetected, damage and downtime to the washroom can result, as well as a potentially dangerous or unhealthy environment for workers and patrons.

Damage and an otherwise undesirable environment may also result from generally naturally occurring moisture or condensation conditions within the facility, particularly in relatively humid conditions with inadequate ventilation. Moisture and condensation accumulation may go generally undetected over long periods of time, but can result in significant mold, mildew, and odour problems, as well creating safety and health concerns.

The remote collection and use of real-time information has been found to be desirable in order to allow for efficient operation of other systems in commercial and residential properties. For instance, real-time measuring, monitoring, and controlling of security systems, fire systems, and heating ventilation and air conditioning systems (HVAC) have been developed in order to provide for safe, productive environments and to maintain occupant satisfaction levels in commercial and residential properties. However, such advances have generally not been applied to washroom facilities in an acceptable and realistic manner, particularly for remotely detecting and monitoring for overflow conditions, standing water, moisture, and condensation conditions in public facilities, especially washrooms.

SUMMARY

Various features and advantages of the invention will be set forth in part in the following description, or may be obvious from the description, or may be learned from practice of the invention.

The present application is a CIP application of co-pending and commonly owned U.S. patent application Ser. No. 11/015,346 entitled "System and Method for Measuring, Monitoring and Controlling Washroom Dispensers and Products." The '346 application (incorporated herein by reference for all purposes) describes various systems and methods for detecting and remotely monitoring various conditions within a restroom, such as product usage, low product conditions, and so forth, as detected by respective sensors units. The sensor units are in communication (wired or wireless) with a remote washroom monitoring station via data communications units. The washroom monitoring stations may include any manner of video and audio display for receiving and conveying the detected parameter from the sensor units. The washroom monitoring stations may also be configured for communicating with the sensor units via the data communications units in order to remotely control or adjust the sensor parameters or operating functions.

The '346 application also describes exemplary embodiments wherein the sensor units include sensors for detecting and monitoring for the presence of water in the washroom from, for example, an overflow from a toilet or sink. It should be understood that "toilet" is meant to encompass any conventional commode or urinal, including wall mounted and floor urinals. A data communications unit may be in wireless communication with the overflow sensor. Further, a washroom monitoring station may be included and may be in wireless communication with the data communications unit and with the overflow sensor through the data communications unit. The washroom monitoring station may be configured for indicating the presence of water when detected by the overflow sensor, including generating an alarm signal. The overflow sensors may be selected from a variety of sensors including, but not limited to, a moisture detector, a pressure sensor, and/or a float switch.

The present application relates to various unique sensor devices and systems that may be used for detecting overflow conditions in a washroom or any other facility where overflow from a toilet, sink, or the like, is a concern. The sensor devices of the present application may be particularly useful in a remote monitoring system as described in the '346 application, but are not limited to use in such systems. The present invention encompasses use of the overflow sensors alone or as a component of a more complex monitoring system of any type.

In a particular embodiment of the invention, a system is provided for detecting an actual or impending overflow condition from a washroom fixture, such as a toilet or a sink. The system includes an overflow sensor configured with the fixture at a location to detect an abnormal rise in water level within the fixture before water overflows the fixture. A data communications unit is in communication with the overflow sensor, and a washroom monitoring station is in wireless communication with the data communications unit and in communication with the overflow sensor through the data communications unit. In this manner, the washroom monitoring station is configured for indicating the presence of water when detected by the overflow sensor. The washroom monitoring station may be a remote centralized station configured for monitoring a plurality of different washrooms.

The overflow sensors may be configured in wireless or wired communication with the data communications unit. Wireless communication provides various benefits with respect to location of the various components, but requires separate power supply sources for the sensors.

In a particular embodiment, the washroom includes a plurality of toilet and sink fixtures, with at least one of the overflow sensors associated with each toilet and sink. Each of the sensors is identified by a unique identification or location tag at the washroom monitoring station so that an alarming sensor may be readily identified and located. This tag may be, for example, an electronic signature, or the like.

The overflow sensors may be configured in various ways, and generally will include a detector, a power supply, and control electronics. These components may be provided in a compact package, including the detector, or the detector may be located remotely from a control electronics package (i.e., processor, power supply circuitry, communications circuitry, and so forth). This embodiment may be desired in that the electronics package can be located in a protected space. The detector may be in wireless or wired communication with the electronics package, and may include a dedicated power supply or be supplied with power through the electronics package. Any number of suitable configurations are within the scope of the invention.

In a particular embodiment, the overflow sensor is configured with a toilet and comprises a remote detector located to detect an abnormal rise in water level within the toilet bowl. The control electronics are provided as a package configured with the toilet seat. For example, the package may be embedded within the toilet seat. Full or partial access may be provided to the embedded package through, for example, a removable cover plate, or the like. In an alternate embodiment, the control electronics package is attached to an underside of the toilet seat using any conventional means, including adhesives, hook-and-loop material, mechanical clips or fasteners, and the like.

To provide for design differences between fixtures, the detector may be adjustable in height within the fixture receptacle, such as the toilet bowl or sink cavity. This feature may be accomplished by various means, including mounting the detector by removable and reusable means such as a releasable and reusable adhesive. In an alternate embodiment, a mechanical arrangement may be used, such as a slide rail or groove along which the detector is adjusted. Various mechanical configurations may be used in this regard.

It may be desired to mount the detector component of the overflow sensor so that it is not visible to washroom patrons. For example, the detector may have a size and mounting capability so as to be mounted on the underside of the toilet bowl rim.

Various power-generating schemes are possible within the scope and spirit of the invention. With respect to the overflow sensors, a primary power source may include a battery, connection to a building's main power system, and so forth. In a particularly unique configuration, at least one solar (photovoltaic) panel is configured for delivering power to the overflow sensor. These panels are well known in the art and are used in various applications for generating power responsive to received light from any number of sources, such as the light conditions within a washroom. The solar panel may supply power to recharge a primary battery in the overflow sensor, or may supply primary power directly for operation of the sensor. A regulator may switch power to a backup source, such as a battery, in the event of low light conditions within the washroom. The solar panels may be located at any convenient location within the washroom for efficient generation of power from the existing light conditions.

In an alternate system, the overflow sensors may be supplied with primary or backup power by one or more motion generators operably configured with a member within the washroom that is moved on a regular basis from one position to another by washroom patrons, such as a stall door, toilet seat or cover, cabinet door, and so forth. The motion generator may be any one or combination of devices know in the art for generating power from movement of a device, and may include a dynamo, kinetic generator, and the like. The motion generator devices may be used to supply a trickle charge to a primary rechargeable battery.

Various types of liquid level detectors may be used as overflow sensors within the scope and spirit of the invention, including conventional pressure detectors, capacitive detectors, inductive detectors, temperature sensors, mechanical devices such as float switches, and so forth. In a particular embodiment, the overflow sensor includes an ultra wideband (UWB) detector that is capable of "seeing" through the fixture wall or receptacle. For example, the detector may be mounted out of sight to the back outside surface of a toilet bowl, or to a sink under the sink cabinet, and be able to detect an abnormal rise in water level with the toilet bowl or sink.

In still another embodiment, the overflow sensor may include tuned radio frequency oscillator circuit that generates a detectable shift in frequency at a predetermined water level within the fixture. This frequency shift may be monitored and detected as an alarm condition for an impending overflow condition.

In yet another embodiment, the overflow sensor may include an ultrasonic liquid level detector disposed to transmit and receive a reflected beam of ultrasonic energy from a rising water column with the fixture receptacle.

The overflow sensor may also be a laser device located to transmit a beam into the washroom fixture receptacle, such as a sink or toilet bowl. The height of water within the receptacle may be determined as a function of time delay between transmission and reception of the reflected beam, or as a function of phase shift between the transmitted and received light. Various commercial laser sensors are available for this purpose. The laser transmitter/receiver may be ceiling or wall mounted above respective washroom fixtures, or at any other convenient location.

Various of the overflow sensors contemplated for use in a system according to the invention are active devices that transmit a signal or beam, such as the ultrasonic, UWB, and laser sensors discussed above. All of these devices may transmit at a continuous pulsed frequency, or remain dormant until triggered by an event in the washroom, such as flushing of the toilet or use of a sink, opening of a stall or washroom door, or detection of movement or a person within the washroom. This configuration results in far less energy consumption and extends the life of the various components.

Many modern washroom facilities utilize automatically triggered fixtures. For example, many public restrooms now utilize infrared (or other sensing techniques) to automatically flush the toilet after a patron is detected and subsequently leaves the detection zone. Likewise, sink spigots may be automatically actuated upon detection of a patron's hands within a detection zone. It is within the scope and spirit of the present invention to configure a washroom monitoring system with control circuitry of these automatic fixtures such that the fixtures can be isolated or deactivated in the event that an overflow or standing water condition is detected within the restroom. For example, an overflow sensor may indicate that a particular toilet or sink is about to overflow, or has already overflowed. Integrated control of the fixture by the washroom monitoring station may allow for manual or automatic deactivation of the subject fixture to stop the overflow condition from worsening. The washroom may be provided with remotely controlled isolation or supply valves controlled by the washroom monitoring station for this purpose as well. A controllable valve may be provided for each fixture, or a single valve may be assigned to a plurality of fixtures. has already overflowed. Integrated control of the fixture by the washroom monitoring station may allow for manual or automatic deactivation of the subject fixture to stop the overflow condition from worsening. The washroom may be provided with remotely controlled isolation or supply valves controlled by the washroom monitoring station for this purpose as well. A controllable valve may be provided for each fixture, or a single valve may be assigned to a plurality of fixtures.

As mentioned, despite best efforts to monitor for overflow conditions, they may still occur undetected and result in water on the washroom facility floor. Water or wetness may also result from leaks, breaks in supply lines, vandalism, condensation, and any other source. In this regard, it is also within the scope and spirit of the invention to integrate sensors into a washroom monitoring system to detect and alert to the presence of such conditions. It should be understood that use of the terms "water" or "wetness" may be used interchangeably and are intended to encompass any detectable amount of liquid, regardless of source.

One embodiment for detecting wetness on the floor of a facility utilizes a temperature-sensing device that reacts to changes in the heat signature of a monitored area as a result of introduction of wetness to the area. Various temperature sensors may be utilized in this regard. In a particular embodiment, the sensor is an infrared sensor that monitors the temperature around one or more of the washroom fixtures. If the measured temperature fluctuates above a threshold value for a defined period of time, an alarm signal is generated by the washroom monitoring station to indicate the likely presence of water in the monitored area. Preferably, the sensor is automatically calibrated with expected changing conditions that may cause temperature fluctuations, such as the HVAC system. The sensor is also calibrated so as not to alarm under normal operating conditions, such as a patron shaking water off of their hands after washing.

In another embodiment, sensors are disposed to detect changes in electrical characteristics in a conductive monitored area of the washroom floor resulting from water on the floor. The monitored area includes an array or pattern of electrically conductive members that react to the presence of water and generate a detectable electrical characteristic that is monitored for by an associated sensor unit. For example, in one embodiment, conductive members may define an open circuit that is completed if water or moisture bridges between the members. A sensor unit detects the completed circuit and communicates with the washroom monitoring station. Alternatively, the conductive members may define a completed circuit that is shorted or otherwise varied by introduction of water or moisture into the monitored area. The sensor unit detects a changed electrical characteristic, for example impedance or resistance of the circuit, and communicates an alarm signal to the monitoring station.

Various configurations of conductive members may be used to create the monitored areas. For example, conductive loops of material may define a perimeter of a monitored area around the base of a fixture, or adjacent to a sink area. The loop may be exposed at the surface of the floor such that water crossing between any two points on the loop creates a detectable loop. In an alternate embodiment, the loop may be electrically insulated, and any desired pattern of exposed conductive members may be disposed within the loop. The conductive members may be formed directly into the floor material, or in a mat, pad, or other portable member placed on the floor at any desired location. The members may be used to create an attractive floor design, or arranged into an existing floor design so as to be indistinguishable therefrom. The pads may include an electrically insulating base material with a grid or pattern of conductive members disposed thereon.

The pads or other conductive member arrangements include a sensor control package that also supplies power to the members at a continuous or periodic rate. The sensor units are configured to monitor for and detect changes in electrical characteristics depending on the sensing principle employed. For example, the control package may detect completion of a circuit across the members, or a conductive change in a completed circuit (e.g., a resistive or impedance change). Each pad or monitored area may have a dedicated sensor control package, or a single control package may be configured to cycle through a plurality of pads or areas. The control packages are all in communication with the washroom monitoring station.

Control logic circuitry or algorithms may be utilized to detect the location of the water, flow rate, or direction of travel of water on the floor as a function of the sequence and timing of alerting pads or areas.

In a particular embodiment, the monitored area includes a pattern of exposed conductive polymeric beads arranged in a symmetrical pattern or as part of any desired surface pattern, including a logo or emblem. The beads may be electrically linked or connected along distinct open circuit legs of a circuit such that water between the beads of adjacent legs completes a circuit, which is detected by the sensor unit. Various patterns or designs of the beads may be used for this purpose. In an alternate embodiment, a pattern of beads may be disposed in a pattern wherein they are electrically isolated from each other, but electrically connected to a common circuit, such as a charged plate. Water bridging any of the exposed beads will change detectable characteristics of the circuit, which are detected by the sensor unit.

As with other embodiments, the detection threshold of the sensor units associated with the conductive members or pads is adjustable and calibrated so as not to alarm under normal operating circumstances, including normal temperature and humidity conditions.

As with the overflow sensors, the water or wetness sensors may also be integrated with automatic fixture controls or isolation valves through the washroom monitoring station.

Aspects of the invention will be discussed in greater detail below by reference to embodiments represented in the drawings.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
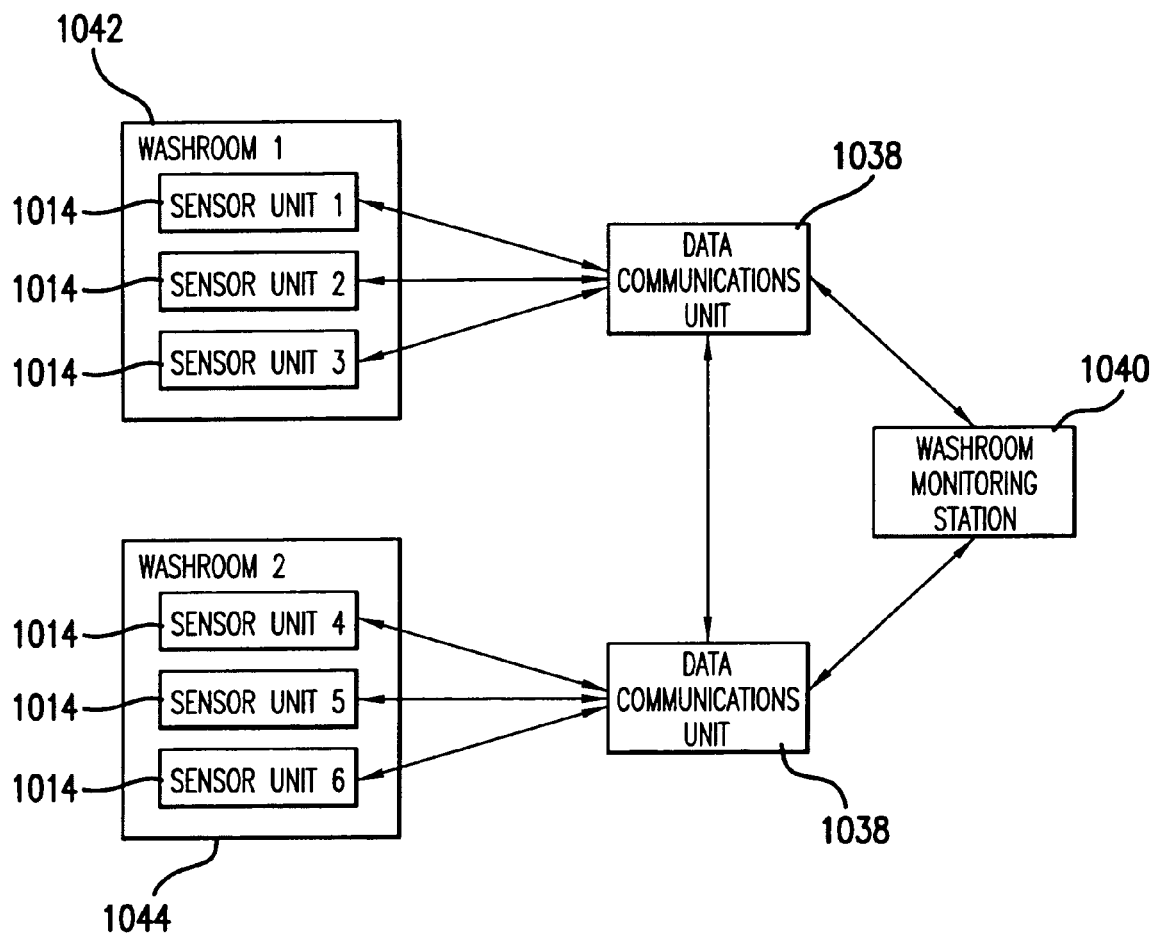
FIG. 1 is a schematic view of the logical relationship between washroom sensor units, data communication units, and a washroom monitoring station in accordance with an exemplary embodiment of the invention.

Repeat use of reference characters in the present specification and drawings is intended to present same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

FIG. 1 is a schematic view of a washroom monitoring system that may employ any manner and combination of sensors for monitoring and measuring various parameters within a washroom, including overflow conditions that may be caused by a backed-up toilet or sink. It should be appreciated that the term "washroom" is meant to include any facility, room, or the like, wherein sinks or toilets are provided, and may include, for example, kitchen or break room areas, janitorial closets, public or private restrooms, labs, and generally any location wherein overflow conditions are to be prevented or quickly identified. In FIG. 1, the overall system includes a plurality of sensor units (SUs) 1014, data communication units (DCUs) 1038, and a washroom monitoring station (WMS) 1040. Any number and combination of the same or different SUs 1014 may be uniquely located within a respective washroom 1042, 1044 to detect a potential overflow condition. The overflow SUs 1014 will be described in greater detail below.

In the exemplary arrangement of FIG. 1, each of the six SUs 1014 communicates with either one of a pair of DCUs 1038. Typically the SUs 1014 within one washroom 1042, 1044 will communicate with the same DCU. It is to be understood, however, that this arrangement may depend upon the proximity of the DCU 1038 to the SU 1014, particularly for wireless communications. Other arrangements are possible such that a washroom may span across one or more DCUs 1038. Alternatively, a number of washrooms may be in communication with a single DCU 1038 in accordance with various exemplary embodiments.

The DCUs 1038 may intercommunicate using a standard communications mechanism and protocol know in the art. The system can be monitored from a remote washroom monitoring station (WMS) 1040 that is in communication with the DCUs 1038. The WMS 1040 displays information regarding the status of each SU 1014 and DCU 1038, including but not limited to operational status, power level, alarm conditions, location, sensor identification, and so forth. The WMS 1040 may be a dedicated application running on a personal computer (PC) with functions including, but not limited to, printing reports and exporting data in various formats. The WMS 1040 may also be based around a PC running a web browser where each DCU 1038 in the system serves web pages containing information on SUs 1014 and DCUs 1038 in the system. In addition, all or part of the functions of the WMS 1040 may be included within a dedicated display unit.

Figure 2:
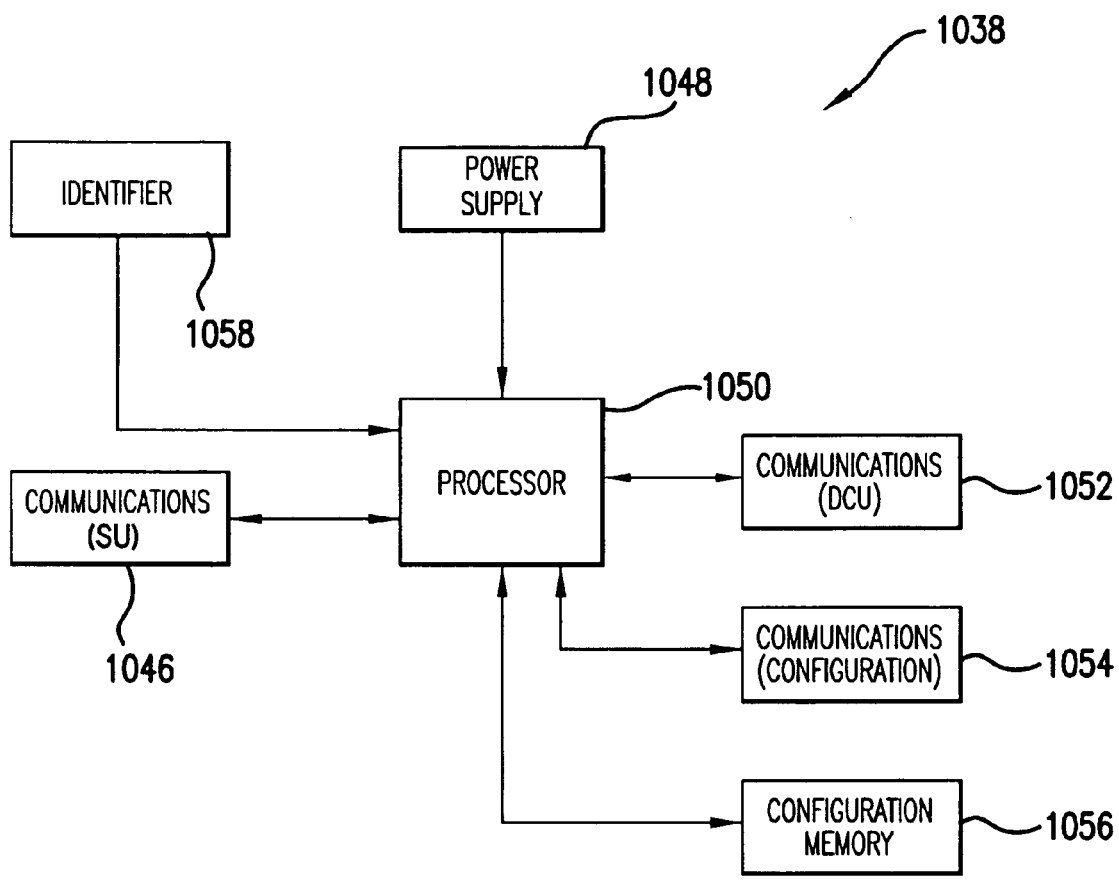
FIG. 2 is a schematic view of an internal arrangement of a data communications unit in accordance with an exemplary embodiment.

FIG. 2 is an exemplary embodiment of the internal arrangement of the DCU 1038. The electronics of the DCU 1038 may be powered from any suitable power supply 1048. The DCU 1038 includes a processor 1050 that may be connected to various communications elements. The processor 1050 implements control functions and programs, which in this embodiment may be stored in a chip set embedded on a printed circuit board within the processor 1050, and which is used to control and process data for the various SUs 1014 via an appropriate first communication element 1046. The communication element 1046 is a transceiver with wired and wireless capability. The standards adopted for the communications element 1046 is matched to the SU 1014 communications.

The second communication element 1052 may be dedicated to communications with other DCUs 1038 and WMS 1040. The second communication element 1052 is based upon one or more standards, including but not limited to IEEE 802.3i (Ethernet 10Base T) and IEEE 802.11b (11 Mhz WiFi). In this manner, the DCUs 1038 can be connected using standard networking technologies. The DCU 1038 communications run over a suitable network protocol such as TCP/IP. This allows an HTTP web server to be incorporated within each DCU 1038 so that web pages can be served to a web browser located on the network. The DCU 1038 may be connected to a local area network (LAN) through a standard RJ45 socket. Use of the web browser will allow a user to navigate through information contained in the DCU 1038. To ensure that only authorized users can access information in the DCU 1038, password protection may be implemented in the web server. A PDA may be used so as to allow for flexibility regarding locations in which a user may access information in the DCU.

The third communications element 1054 is dedicated to communications allowing the DCU 1038 to be configured for operation. The third communications element 1054 is based upon one or more standards including but not limited to EIA RS232. A non-volatile memory 1056 is used to store configuration information so that the DCU 1038 retains configuration and other useful information during power down. The DCU 1038 has a unique identifier 1058 so as to allow for the DCU 1038 to be located and identified.

It is understood that wireless communication between any combination of components within the washroom monitoring system may employ any known communications technology, such as Wi-Fi (wireless fidelity) and Bluetooth.

Figure 3:
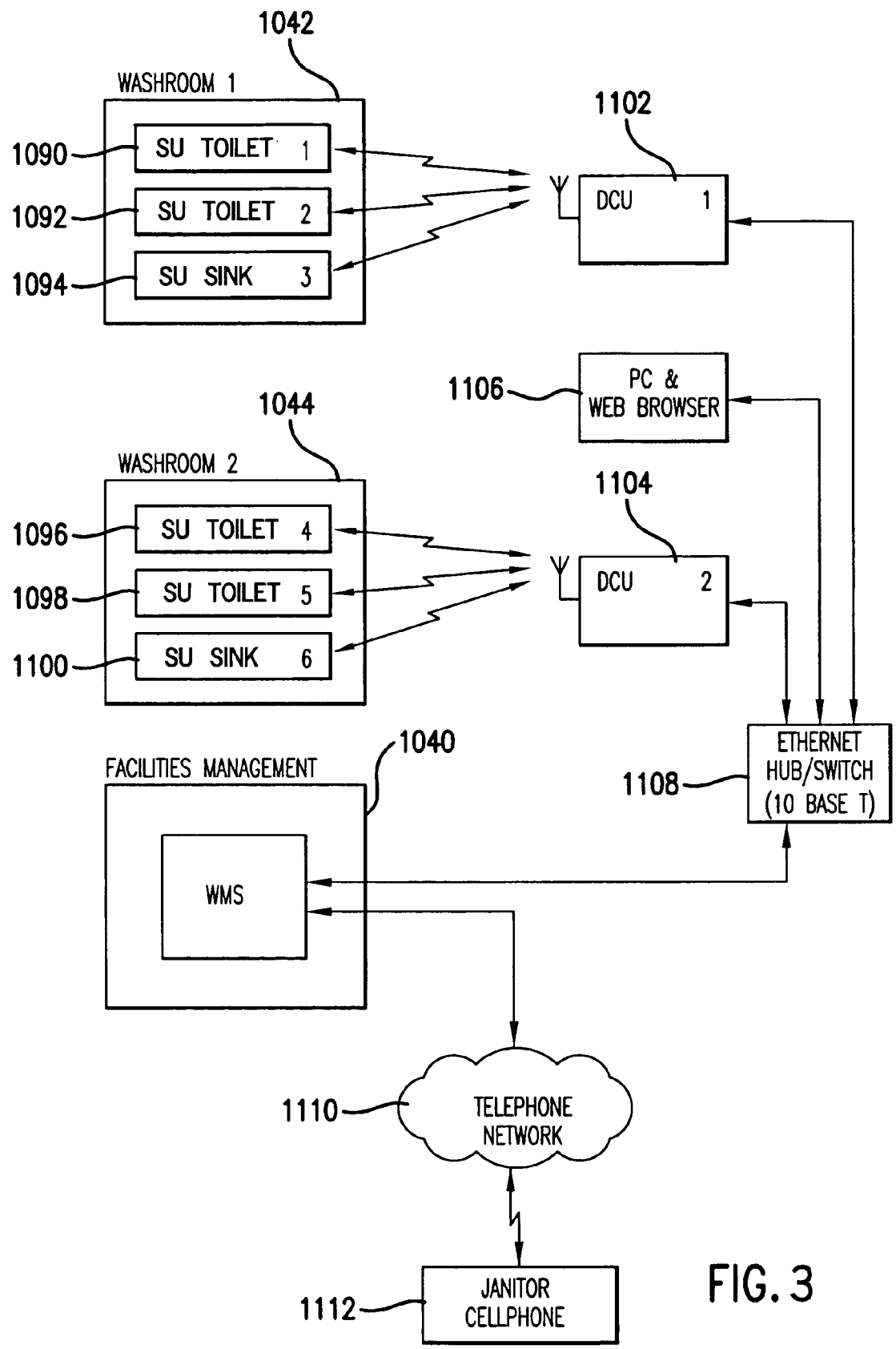
FIG. 3 is a schematic view of an exemplary relationship between toilet and sink overflow sensor units, data communication units, a washroom monitoring station, and other components in accordance with an exemplary embodiment of the invention.

An exemplary embodiment of the operation of a washroom monitoring system is shown in FIG. 3 configured for monitoring various potential overflow conditions in a first washroom 1042 and second washroom 1044. The first washroom 1042 is configured with toilet overflow sensors 1090, 1092, and a sink overflow sensor 1094. Likewise, the second washroom 1044 is configured with toilet overflow sensors 1096, 1098 and a sink overflow sensor 1100. Appropriate sensors may be located for each toilet and sink within the washrooms. Each sensor is configured as a SU 1014 having the same or different detection mechanisms, wireless transmitter, and power supply. The transmitter operates in the FM frequency range 902 MHz to 920 MHz at a maximum output level of 1 mW.

The SUs from each washroom 1042 and 1044 transmit to separate DCUs 1102 and 1104. Each DCU 1102 and 1104 has a corresponding wireless receiver. FIG. 3 shows a facilities management suite, part of which includes a WMS 1040. The WMS 1040 and both DCUs 1102 and 1104 communicate over 10 BaseT Ethernet through a switch device or hub 1108. The WMS 1040 is also connected to a standard telephone network 1110 so that relevant alerts can be made to a cell phone 1112 carried by a janitor or maintenance personnel.

In this embodiment, the function of the DCUs 1102 and 1104 is to receive and process signals from the SUs 1090, 1092, 1094, 1096, 1098 and 1100. Each DCU 1102 and 1104 relay alerts to indicate a detected actual or potential overflow condition, or sensor fault (i.e., low power supply) to the WMS 1040. In addition, each DCU 1102 and 1104 includes a web server so that information may be viewed from a web browser running on a computer 1106 attached to the network. If the network is connected to the Internet, the information may be viewed remotely.

As mentioned, the function of the WMS 1040 includes receiving and processing alerts or alarm conditions from the SUs 1090, 1092, 1094, 1096, 1098, and 1100 in its configuration. Alerts or alarms are displayed and can be audibly annunciated by the WMS 1040. In addition some or all alerts can be sent to a cell phone 1112. The preferred method of annunciation to a cell phone 1112 is through the short message service (SMS) that is normally a feature available from most cell phone service providers. However, the system is not limited to this method of annunciation and can include alerts via email, radio paging and audible alerts by telephone.

The communication system of FIG. 3 may be bi-directional in that the SUs 1090, 1092, 1094, 1096, 1098, and 1100 may be reprogrammed or controlled by the PC and web browser 1106, DCUs 1102, 1104, the WMS 1040, or by cell phone 1112. For instance, the user may through the WMS 1040 adjust the detection frequency, range, or other operational parameter of the SUs. Bi-directional controlling may be advantageous in that the adjustment is made remotely without a janitor or maintenance personnel actually visiting the washroom.

It is to be understood that in accordance with various exemplary embodiments, the WMS 1040 may communicate directly with the SU 1014 without the need for the DCU 1038 to be present.

Figure 4:
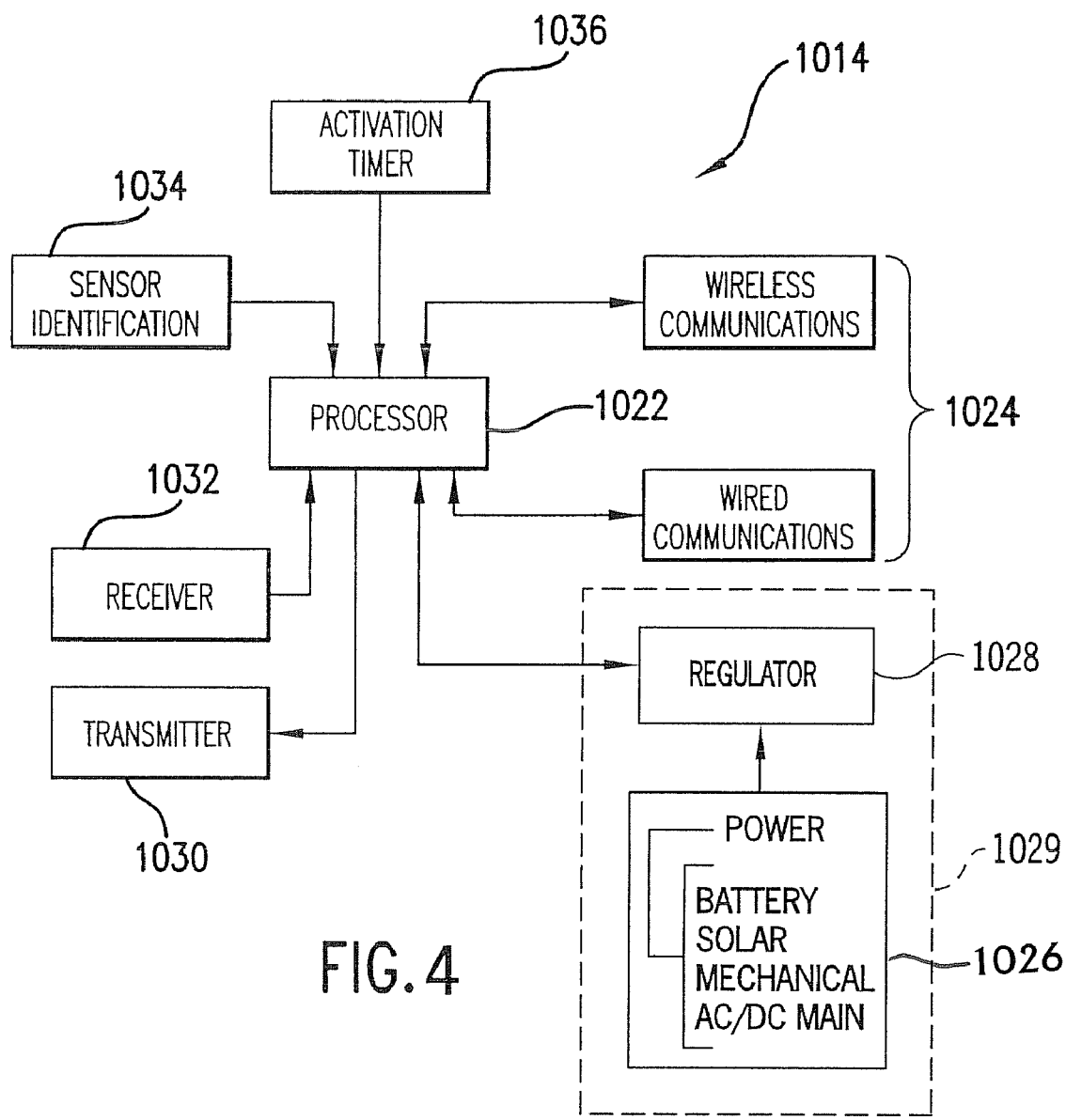
FIG. 4 is a schematic view of an exemplary internal arrangement of an overflow sensor unit that may be employed a monitoring system according to the invention.

FIG. 4 shows an exemplary internal arrangement of a SU 1014 configured as an overflow sensor. The SU 1014 includes a processor 1022 connected to communications electronics 1024 that allows the SU 1014 to communicate externally either by wires or wireless. The communication electronics 1024 may include either a transmitter or a transceiver. Additionally, in accordance with certain exemplary embodiments, bi-directional communications may be employed. Wireless communications may be based upon one or more license exempt standards including but not limited to IEEE 802.15.4 at 2.4 GHz or 915 MHz in compliance with the requirements of FCC Part 15. A wired arrangement may be based upon an electrical bus standard including but not limited to EIA RS485.

The SU 1014 is configured with a power supply 1029 that may contain a power source 1026 and a regulator 1028. The power source 1026 may be, for example, a battery, solar panel, AC or DC power from the facility's main power system, a mechanical power source, and generally any conventional power source. The power source may also include a backup power source should the main power source fail. For example, the regulator 1028 may include a battery level sensor to monitor a main battery 1026 in order to determine when battery change out is required. The battery level sensor may take the form of a simple voltage reference. The regulator 1028, or processor 1022, may cause switch over to an alternate power supply should the battery level fall below a prescribed voltage level. Alternatively, the SU 1014 may be powered by an appropriate external power supply, or in the case of wired configuration, the SU 1014 may be powered from a communications bus. Depending on the detection principle utilized, the SU 1014 may contain a transmitter 1030 and a receiver 1032 in communication with the processor 1022. The SU 1014 may include a unique identifier signal 1034 used within the overall system to locate each particular SU 1014. The processor 1022 may be activated intermittently through an activation timer 1036, such as a frequency oscillator timing circuit as is commonly known in the art. The power source 1026 (i.e., battery) is also checked after each SU 1014 activation. If the battery level is low, this status is transmitted using the communications facility. After the activation cycle is complete, the SU 1014 may be placed into a low power state and once again waits for the activation timer to activate the processor 1022.

Figure 5:
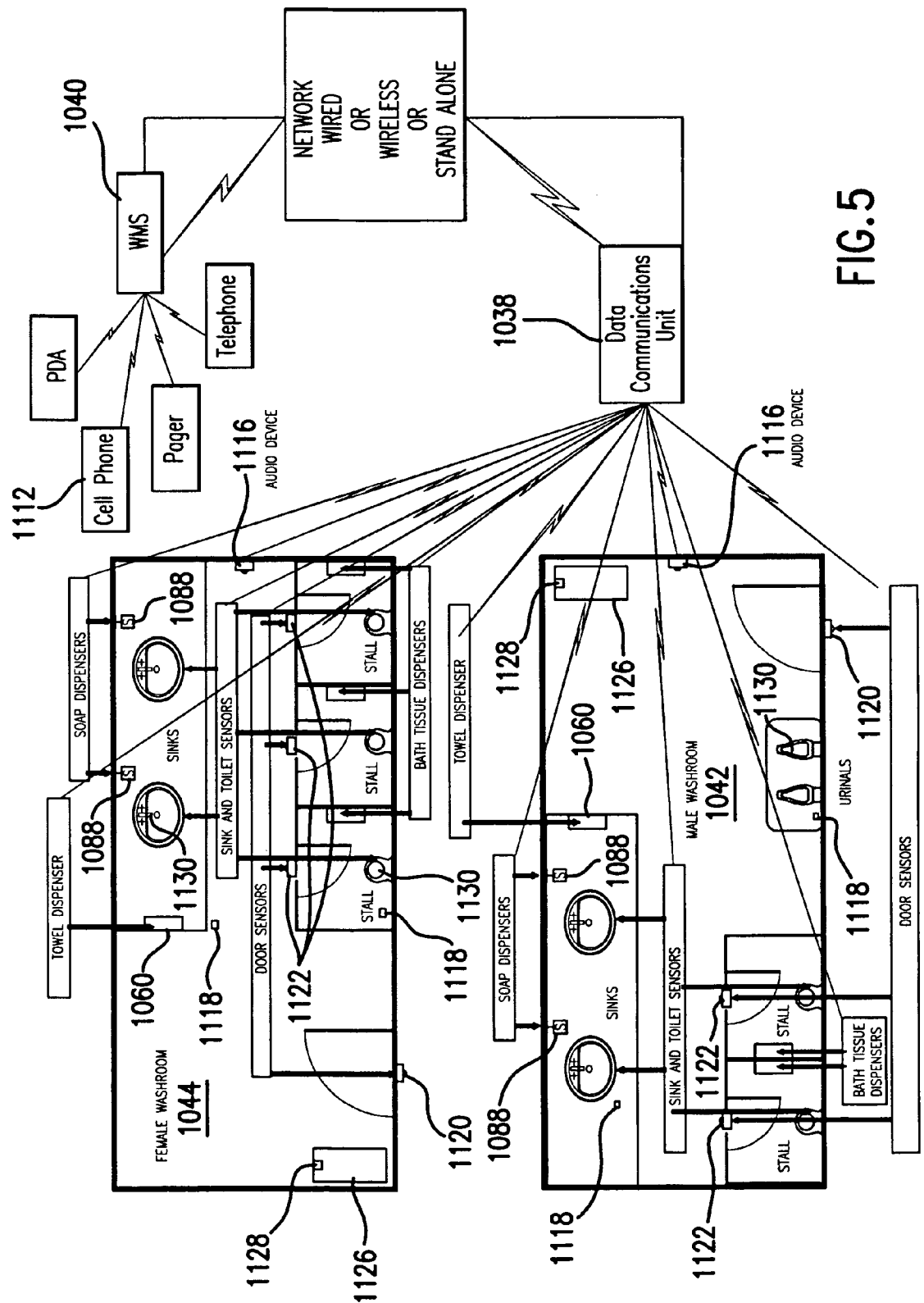
FIG. 5 is a schematic view of a system for monitoring, reporting and analysing various washroom components and conditions, including overflow conditions, in accordance with an exemplary embodiment of a system incorporating overflow sensors according to the invention.

FIG. 5 depicts a washroom monitoring system used to detect and monitor a variety of conditions and parameters. Overflow sensors in accordance with the invention may be used in this or a similar system. For example, overflow sensors 1118 for individual sinks, toilets, urinals, and/or floor areas adjacent thereto to provide advanced warning of a water overflow or flood situation. The overflow sensors 1118 may be capable of being fitted discreetly to a sink, toilet or urinal for detecting the presence of water. The overflow sensors may have internal structure similar to the SU 1014 as previously described in order to communicate with a DCU 1038.

The overflow sensors 1118 may operate according to any combination of principles, including moisture or liquid detectors, pressure sensors, mechanical float switches, and so forth. A moisture detector may include a resistance bridge in which contact with water forms one side of the bridge. The bridge may be capable of detecting the difference between an open circuit and a prescribed resistance value. A pressure sensor may include a water resistant diaphragm capable of detecting slight differences in pressure between the lack of water and immersion in water above a nominal height, for example 2 cm or approximately 0.2 kPa. A float switch may include a small float attached to an arm that throws a switch when water reaches a predetermined level. Additional overflow sensors 118 are described in greater detail below.

The SU 1014 may be housed in a waterproof case to protect the electronics and battery 1026. In use, the overflow sensor 1118 detects the presence or absence of water. If the presence of water is sustained for a defined period of time in excess of the usual flushing period, an alert is signaled to the SU 1014 or other component in communication with the overflow sensor 1118. The WMS 1040 administrator is alerted to an overflow condition by the WMS 1040 and takes action should an alert occur. Such an alert may be transmitted by the WMS 1040 via any number of portable sources 1112, such as a PDA, cell phone, pager, telephone, and the like, so that the janitor or maintenance personnel need not directly monitor the WMS 1040. An audio device 1116 (or visual display device) may be present in the washroom and in communication with the DCU 1038 to provide an indication within the washroom that an overflow condition has been detected.

In addition, an apparatus may be included for monitoring and controlling the flow of water to determine if excess water is being used by a faucet, toilet and/or urinal that is left running. The DCU 1038 may be in communication with a flow sensor 1130, as shown in FIG. 5. Further, a WMS 1040 may be included and may be in communication with the data communications unit 1038 and with the flow sensor(s) 1130 through the data communications unit 1038. The WMS 1040 may be configured for indicating the flow of water when detected by the flow sensor(s) 1130. The flow sensor(s) 1130 may be selected from a variety of sensors including, but not limited to, a rotating vane and/or differential pressure unit.

A SU 1014 may be incorporated into other devices used within a washroom for the purposes of monitoring or controlling, such as waste receptacles to determine when to empty or detect overflow situations. A sensor 1128 for a waste receptacle 1126 includes but is not limited to a mechanical switch, infrared or other proximity sensing device, strain gauge or pressure sensor. A mechanical switch can be mounted on to the lid of a waste receptacle 1126. When the receptacle 1126 is full and the lid and switch remain open for an extended period of time an alert can be signaled. Alternatively the switch can be used to count the number of times the lid has been opened and closed. The SU 1014 can infer that the waste receptacle 1126 is full after a certain number of counts, predetermined for each receptacle 1126 type. An infrared sensor can be mounted onto the side of the receptacle 1126 and so long as the liner used to contain the refuse is transparent, the sensor can be used to signal an alert when the level of refuse reaches a particular point. A strain gauge or pressure sensor can be used to weigh the contents of the receptacle. At a pre-determined weight an alert can be signaled.

A further enhancement may provide the capability of monitoring and reporting hand washing compliance in public washrooms, nurses' and doctors' lounges and nursing stations in various units of healthcare, food preparation or food processing facilities. This embodiment may expand on previously discussed embodiments to measure washroom traffic or visits as they relate to product usage and in conjunction with controlling dispenser parameters and any combination of audio, text or graphics prompts to remind users to wash their hands before and after contact with a patient or food or other to encourage, quantify and report hand washing compliance.

The exemplary embodiment of FIG. 5 has the capability of measuring product usage, as described in detail in U.S. Pat. Nos. 5,878,381; 6,360,181; and 6,411,920.

Referring still to FIG. 5, the first washroom 1042 may be a male washroom, and the second washroom 1044 may be a female washroom. Door or entrance sensors 1120 are provided, as are stall door sensors 1122 that are used to determine when the doors or stalls are opened or closed or detect movement therewith. Such an arrangement may include a magnet and associated read switch attached to the washroom 1042, 1044 doors or to stall doors for detecting movement therewith. Sensors such as infrared or ambient light sensors may also or alternatively be used to sense the presence of the user in the washrooms 1042, 1044. Events are time and date stamped to enable correlation of visits to the washrooms 1042, 1044 with usage from, for example, towel dispensers 1060, tissue dispensers 1060, soap dispensers 1088, or any other product dispenser.

In operation, a user would enter the washroom 1042 or 1044 and have his or her presence noted by one of the sensors 1120 or 1122. As the individual uses the towel dispenser 1060 or soap dispenser 1088, the displacement of the product is monitored and recorded. The products of such analysis may further be stored in the memory area of the dispensers 1060 or 1088 for further analysis and/or retrieval. When the user leaves the washroom 1042, 1044, such movement is also recorded by one of the sensors 1120 or 1122 referenced above. Sensors that are used to monitor individuals in the washroom 1042 or 1044 may be configured so as to be able to detect and discern the identity of individual users of the washroom through mechanisms commonly known to those of ordinary skill in the art, including but not limited to RFID technology or bar codes. U.S. patent application Ser. No. 10/950,965 titled "A Device For Encouraging Hand Wash Compliance" filed Sep. 27, 2004, shows various ways in which hand-washing compliance may be conducted.

The system can utilize the audio modules 1116 or visual display devices to send reminders continuously or intermittently, or set to broadcast, in the event a user enters the washroom 1042 or 1044, enters and exits the stall and/or leaves the washroom 1042 or 1044 without a correlating towel 1060 and/or soap dispenser 1088 event occurring. With respect to networked devices, the administrator can adjust particular parameters of the device such as but not limited to time intervals between each message, volume, gender voice, multiple languages and the like. The system administrator through the WMS 1040 may change audio information at any time.

An automatic device for flushing a urinal normally uses an infrared detector to determine when the urinal or toilet has been used. Such a device incorporating a SU 1014 may be able to signal its use and prompt the user to wash their hands before leaving the washroom 1142 or 1044 utilizing a washroom display or audio reminder as described previously. The system administrator through the WMS 1040 may change audio and/or display information at any time. The functionality of the sensors, statistics, refill status of the dispensers, etc., can be monitored in real-time by the administrator of the WMS 1040.

Various methods of identifying an individual such as but not limited to RFID, bar code, or keypad entry are known to those having ordinary skill in the art. The identity of the individual may be maintained in a profile that could be accessed through the WMS 1040 in which is it monitored and alerts sent in real time. An exemplary embodiment provides for the ability to maintain the identity of the individual in a profile that could be accessed through the WMS 1040. A discreet message could be sent to the individual's cell phone 1112, pager or like to remind them that they did not wash their hands before leaving the washroom 1042 or 1044.

Figure 6A:
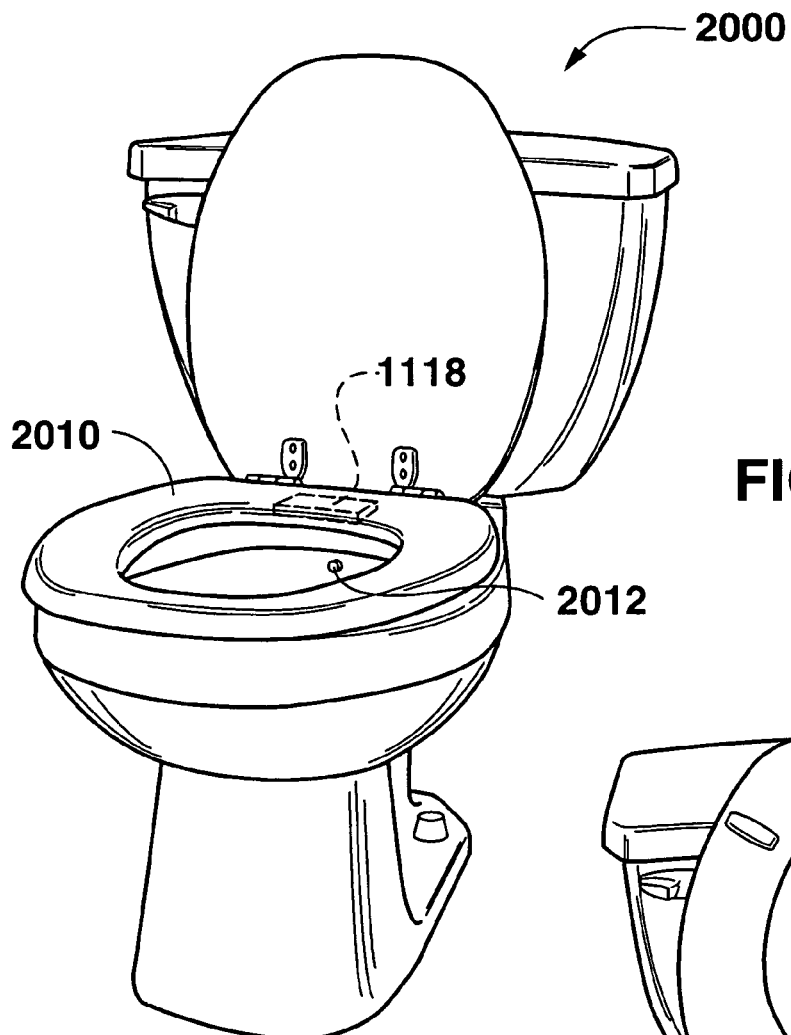
FIGS. 6A and 6B are conceptual illustration of toilets within a monitored washroom incorporating overflow sensors.
Figure 6B:
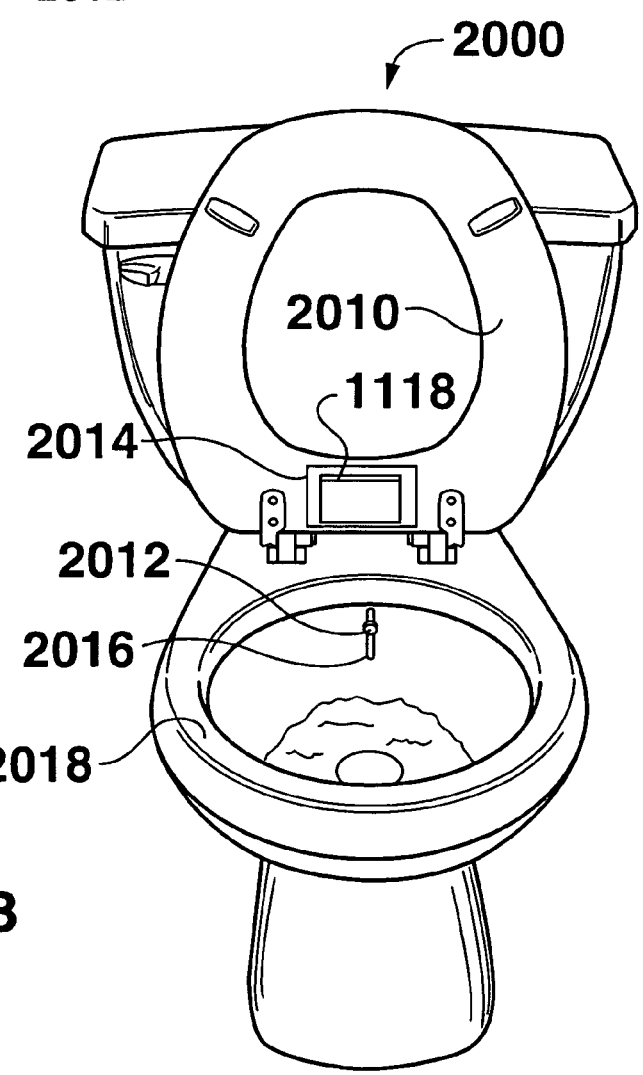

FIGS. 6A and 6B conceptually illustrate embodiments of overflow sensors 1118 configured with conventional toilets 2000 to detect an impending overflow condition caused by blockage of the toilet. The illustrated embodiments may be used, for example, with the washroom monitoring system and configuration of FIG. 5. The overflow sensors 1118 may have the electronic configuration of the SUs 1014 discussed above. In the embodiment of FIG. 6A, the electronic components of the overflow sensors 1118 are embedded within the toilet seat 2010 and are in communication with the overflow detector 2012, preferably via wireless communication as discussed above. The embedded components may be permanently embedded during manufacture of the toilet seat 2010 and access may be provided to the components through, for example, a cover panel on the underside of the seat 2010 for replacing the power supply or servicing the sensor. Alternately, the entire electronics package may be removable from within the seat. In still another embodiment, the electronics package (with the exception of the power supply) may be permanently and non-removably formed into the seat 2010.

The overflow detector 2012 is strategically located within the toilet bowl to sense an abnormal rise of water within the bowl. For example, the detector 2012 may be attached by any convention means, including adhesive, to the wall of the bowl, or on the underside of the bowl rim 2018 so as not to be visible. When located remotely from the sensor 1118, as depicted in FIGS. 6A and 6B, the detector 2012 may be in wireless communication with the sensor processor (FIG. 4) and include its own power supply.

FIG. 6B illustrates an embodiment wherein the electronics package of the overflow sensor 1118 is attached externally to a component of the toilet 2000, for example to the underside of the toilet seat 2010. This embodiment may be desired in that it allows for modification of existing toilets, or incorporation of the sensors 1118 into any manner of conventional toilet. The sensor package 1118 may be attached by any conventional means, including adhesives, clips, hook-and-loop fasteners, and so forth. In the illustrated embodiment, a waterproof adhesive pad 2014 is provided for attachment of the sensor package 1118. The pad 2014 may also be a hook or loop material for mating with a complimentary loop or hook material on the sensor package 1118. With embodiments wherein the sensor package 1118 is exposed, it may be desired to encapsulate or otherwise protect the package from its operating environment, vandalism, etc. It should be appreciated that, depending on the communications link between the detector 2012 and the sensor package 1118, the package 1118 may be located at remote and hidden locations on the toilet, such as within the tank, or even remote from the toilet 2000. A wired communication path between the components also provides for various location options for the sensor package 1118.

It may also be desirable to adjust the level or height of the detector 2012 within the toilet bowl, or other location, to account for variations in toilet geometry and capacity. This feature may be accomplished simply by providing for reattachment of the detector 2012. For example, the detector may be removably attached with a reusable adhesive. In the illustrated embodiment, the detector 2012 is slidably mounted on a track 2016 that is separately attached to the toilet bowl, the track 2016 having a length corresponding to the adjustment range of the detector 2012. In an alternative embodiment, a channel may be defined in the toilet bowl wall, the detector 2012 being slidable within the channel.

Figure 7:
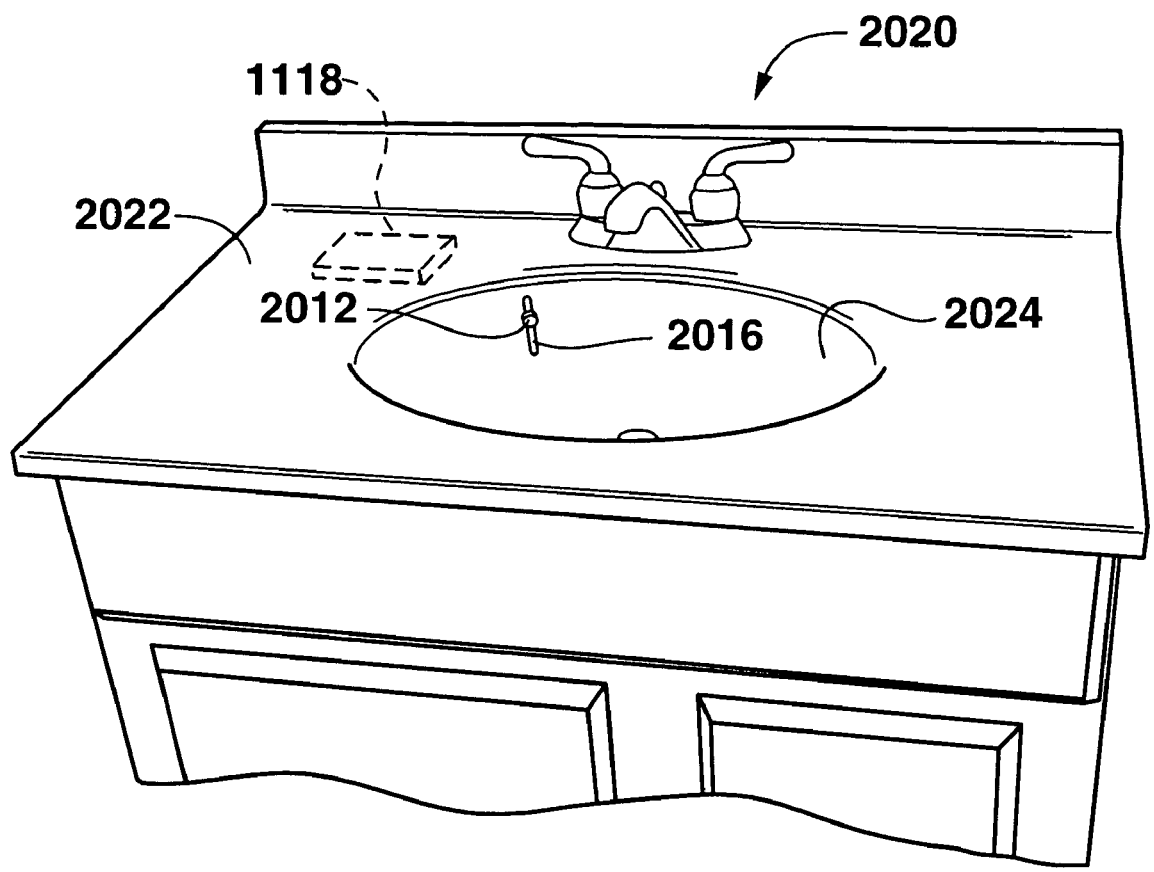
FIG. 7 is a conceptual illustration of a sink or vanity within a monitored washroom incorporating overflow an overflow sensor.

FIG. 7 conceptually illustrates use of an overflow sensor 1118 with any manner of sink station 2020 to detect an abnormally high level of water within a sink 2024. As with FIGS. 6A and 6B, the electronics package portion of the sensor 1118 may be embedded within the sink counter 2022, on top of the counter 2022, under the counter 2022, or at any other desired location. Any degree of access may be provided to the sensor package 1118. As discussed above, the sensor 1118 may include a remotely located detector 2012 that is variably positionable within the sink 2024, for example by way of a track 2016, channel, releasable adhesive, and so forth.

It should be appreciated that embodiments are contemplated wherein the detector is an integral component of the sensor package 1118. Such a configuration would require location considerations to ensure that the sensor 1118 does not interfere with operation of the toilet or sink.

It should be appreciated that the type of detector 2012 is not a limiting feature, and that detectors 2012 utilizing various detection principles may be used, including electrical conductance, RF field attenuation, light reflection from the water surface, differential temperature detection (e.g., infrared detection) caused by water induced temperature changes, pressure detection, mechanical level detectors (e.g., float switches) and so forth. Any number of conventional detectors are known and may be used, including commercially known tank level monitoring systems. A detector operating as a transmitter and receiver (a "transceiver"), as discussed above with respect to FIG. 4, provides many operational advantages in that the detector 2012 need not physically be contacted by the overflowing water.

In a particular embodiment, the overflow sensors are active devices that utilize a transmitter to transmit a beam directed towards the monitored area. Characteristics of the reflected beam are detected and measured as an indication of an abnormally high water level, or even the presence of water. For example, in a particular embodiment, the detector 2012 is an ultrasonic proximity sensor that uses a transducer to send and receive high frequency sound signals. When a target (e.g., rising water) enters the beam, the sound is reflected back to the sensor, causing it to energize or de-energize an output circuit. Commercially available ultrasonic level sensors may be used, such as the Ultrasonic Level Transmitters manufactured by Automated Sonix Corporation of Boca Grande, Fla., including models UL-100, Sonix-40, Sonix-50, and Sonix-60. AMTEK® Drexelbrook of Horsham, Pa., offers the Veri-GAP™ ultrasonic gap switches that provide high/low liquid level indications. Migatron Corp. of Woodstock, Ill., offers an ultrasonic detector (Model RPS-412A) that also monitors and compensates for temperature, relative humidity, barometric pressure, and other factors that influence the speed of sound.

An Ultra Wide Bandwidth (UWB) detector may be desirable for detecting water level through a toilet bowl or sink such that no components of the overflow sensor units 1118 are visible, the sensor 1118 thus being protected from the environment, vandalism, and the like. UWB technology uses a series of precisely timed pulses of broad spectrum radio energy to transmit information. In this way, digital information is transmitted by advancing or retarding digital pulses by fractions of a second. Even though solid objects, such as a toilet bowl or tank, may absorb some radio frequencies, the broad spectrum of UWB transmitters ensures that at least some detectable frequencies representing digital pulses are transmitted and received back through the object. For example, UWB technology has been used to manufacture radar that "sees" through solid objects. Pulson® technology from Time Domain, Inc. of Huntsville, Ala., offers UWB devices that may be configured for use as overflow sensors 1118 in a washroom monitoring system according to the invention.

Aspects of UWB technology are discussed below for a general appreciation of certain capabilities of a monitoring system according to the present invention. For a detailed description of UWB technology, reference is made to "Ultra-Wideband Technology for Short- or Medium-Range Wireless Communications," published in *Intel Technology Journal*, $2^{nd}$ Quarter, 2001. Reference is also made to the following U.S. Pat. Nos. for a detailed description of UWB technology and various implementations thereof: U.S. Pat. Nos. 6,300,903 B1; 6,218,979 B1; 6,177,903 B1; 5,832,035; 5,687,169; 5,677,927; and 5,361,070.

UWB is a wireless technology for transmitting large amounts of digital data over a wide spectrum of frequency bands with very low power. UWB radio has the ability to carry signals through doors, walls, and other obstacles that tend to reflect signals at more limited bandwidths and higher power. UWB broadcasts a larger number of digital pulses that are less than one nanosecond in duration and timed very precisely across a wide frequency spectrum at the same time. The transmitter and receiver must be coordinated to send and receive pulses with an accuracy of trillionths of a second. On any given frequency band that may already be in use, the UWB has so low power and is so broadly spread that it appears as mere background noise. Thus, theoretically, the UWB signal is not subject to interference, and does not subject other devices to interference. A UWB system's power consumption requirements are around one ten-thousandth of that of conventional cell phones.

UWB systems generally possess the following characteristics: short duration pulses; center frequencies typically between 50 MHz and 10 GHz; ultrawide bandwidths of 100+% of the center frequency; multi-mile ranges with sub-milliwatt average power levels (even with low gain antennas); extremely low power spectral densities; lower cost than other sophisticated radio designs; and excellent immunity to fading and jamming from other systems. Very high processing gains are possible with UWB systems. For example, a receiver in a 10 megapulse/sec (100 ns frame) system with a 1 ns pulse need only "listen" when the 1 ns pulse is expected to arrive, obtaining 20 dB of noise rejection. If 100 pulses are set per data bit, an additional 20 dB of gain is achieved in an overall 100 kilobit/sec link. Processing gains of 40 dB or better can be obtained, allowing robust data transmission at levels comparable to or less than ambient noise. The short duration pulses have excellent multipath immunity and do not suffer the pronounced fades of conventional narrowband systems.

UWB technology has also been implemented in a microchip and is thus particularly well suited for incorporation with relatively small liquid level sensors. Time Domain of Huntsville, Ala., USA, provides UWB technology as a single integrated circuit chipset under the name of PulsOn.RTM. PulseLINK of San Diego, Calif., USA, is also another commercial source of UWB technology.

The present applicants also believe that a suitable overflow sensor 1118 may include an accurately tuned RF oscillator circuit to detect a shift in resonant frequency depending upon whether water was present in a toilet bowl or sink above a certain level. Tuning devices may include an inductor and a capacitor arranged either in parallel or series as an LCR circuit. For example, when the axis of the inductor coil is placed perpendicular to the outside surface of the toilet bowl, inductance of the coil should change as water level in the bowl rises, thereby causing a shift in resonant frequency of the LCR circuit. This shift is detectable by attenuation of a fixed frequency tuned signal, or by detecting the shift in frequency.

Figure 9:
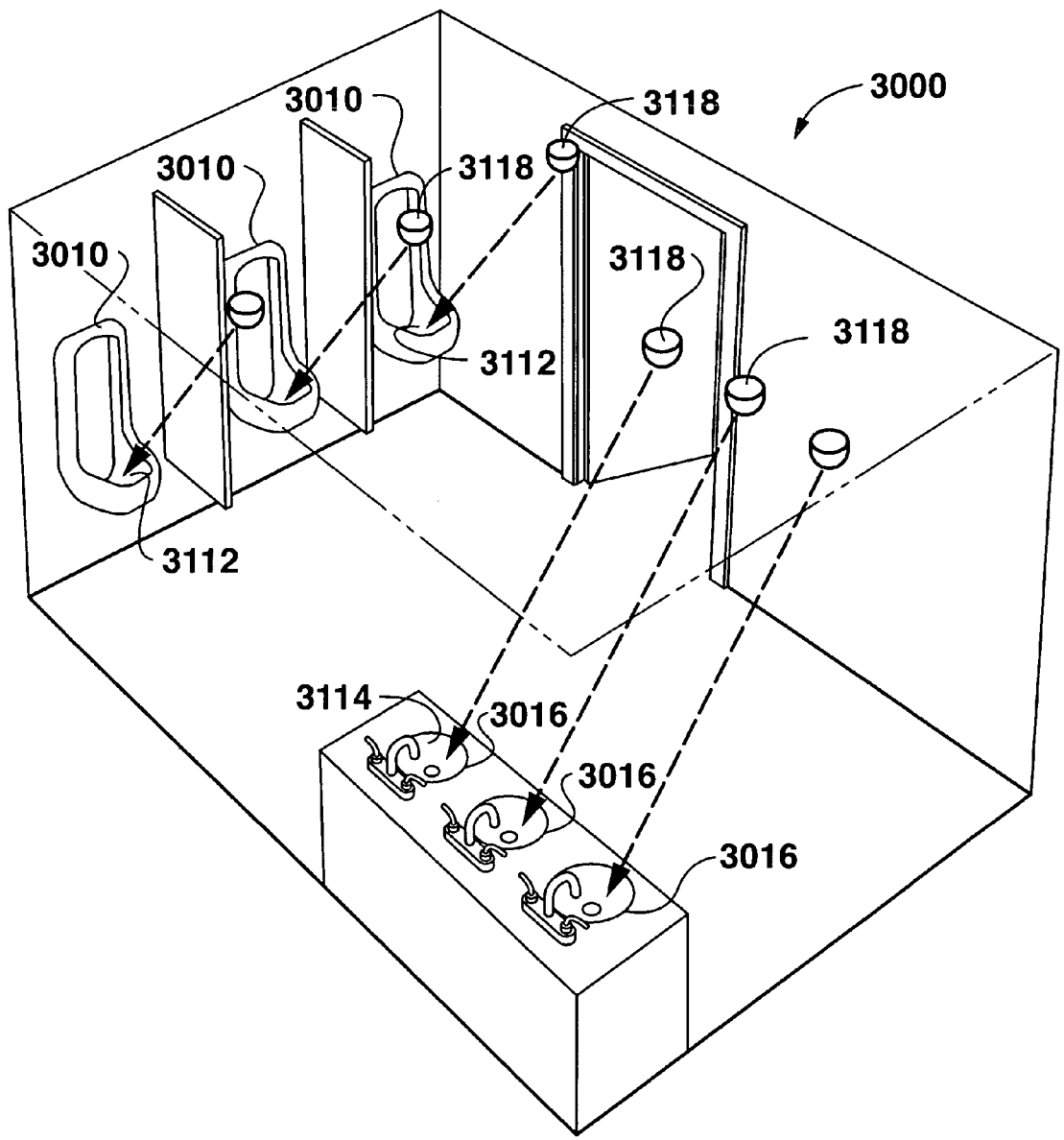
FIG. 9 is a conceptual illustration of an alternative embodiment for monitoring for overflow conditions from toilets and sinks in a monitored washroom according to the invention.

FIG. 9 depicts an embodiment wherein a monitored washroom 3000 employs a plurality of active transmission overflow sensors 3118 to monitor the toilet fixtures 3010 and sink fixtures 3116. The overflow sensors 3118 include a transmitter that directs a beam into the receptacles 3112 of the toilets 3010 and into the basins 3114 of the sinks 3016. The reflected beam is detected by a receiver and analyzed to determine if the fixture receptacles contain an abnormally high level of water. In one embodiment, the active sensors 3118 may include a laser device located to transmit a beam into the washroom fixture receptacle 3112, 3114. The height of water within the receptacle 3112, 3114 may be determined as a function of time delay between transmission and reception of the reflected beam, or as a function of phase shift between the transmitted and received light. Various commercial laser sensors are available for this purpose. Representative laser sensors are available from Phase Laser Systems, Inc. of Scottsdale, Ariz., and Laser Technology, Inc. of Centennial, Colo.

The laser transmitter/receiver component of the sensors 3118 may be ceiling or wall mounted above respective washroom fixtures 3010, 3016, or at any other convenient location. For example, the devices may be mounted in recesses in the ceiling, or behind lenses in the ceiling so as to be generally undetectable. It should also be understood that the electronic control package components of the sensors 3118 may be remotely located from the transmitter and receiver components, and may be in wired or wireless communication therewith. In an alternate embodiment, the sensors 3118 are a complete integral package.

With the embodiment of FIG. 9, a dedicated sensor 3118 is provided for each fixture 3010, 3016. In an alternate embodiment, one such sensor 3118 may be configured to monitor a plurality of fixtures. For example, the sensor 3118 can be rotated or otherwise adjusted according to a set interval pattern to cycle through a plurality of the fixtures.

As discussed, various types of the overflow sensors contemplated for use in a system according to the invention are active devices that transmit a signal or beam, such as the ultrasonic, UWB, and laser sensors discussed above. All of these devices may transmit at a continuous pulsed frequency, or remain dormant until triggered by an event in the washroom, such as flushing of the toilet or use of a sink, opening of a stall or washroom door, or detection of movement or a person within the washroom. In this regard, the overflow sensors may be integrated with other control features of a washroom monitoring system, for example the system of FIG. 5, so as to be triggered by some detected event in the washroom that is monitored by the system. This configuration results in far less energy consumption and extends the life of the various components.

Many modern washroom facilities utilize automatically triggered fixtures. For example, many public restrooms now utilize infrared (or other sensing techniques) to automatically flush the toilet after a patron is detected and subsequently leaves the detection zone. Likewise, sink spigots may be automatically actuated upon detection of a patron's hands within a detection zone. It is within the scope and spirit of the present invention to configure a washroom monitoring system with control circuitry of these automatic fixtures such that the fixtures may be isolated or deactivated in the event that an overflow or standing water condition is detected within the restroom.

Figure 11:
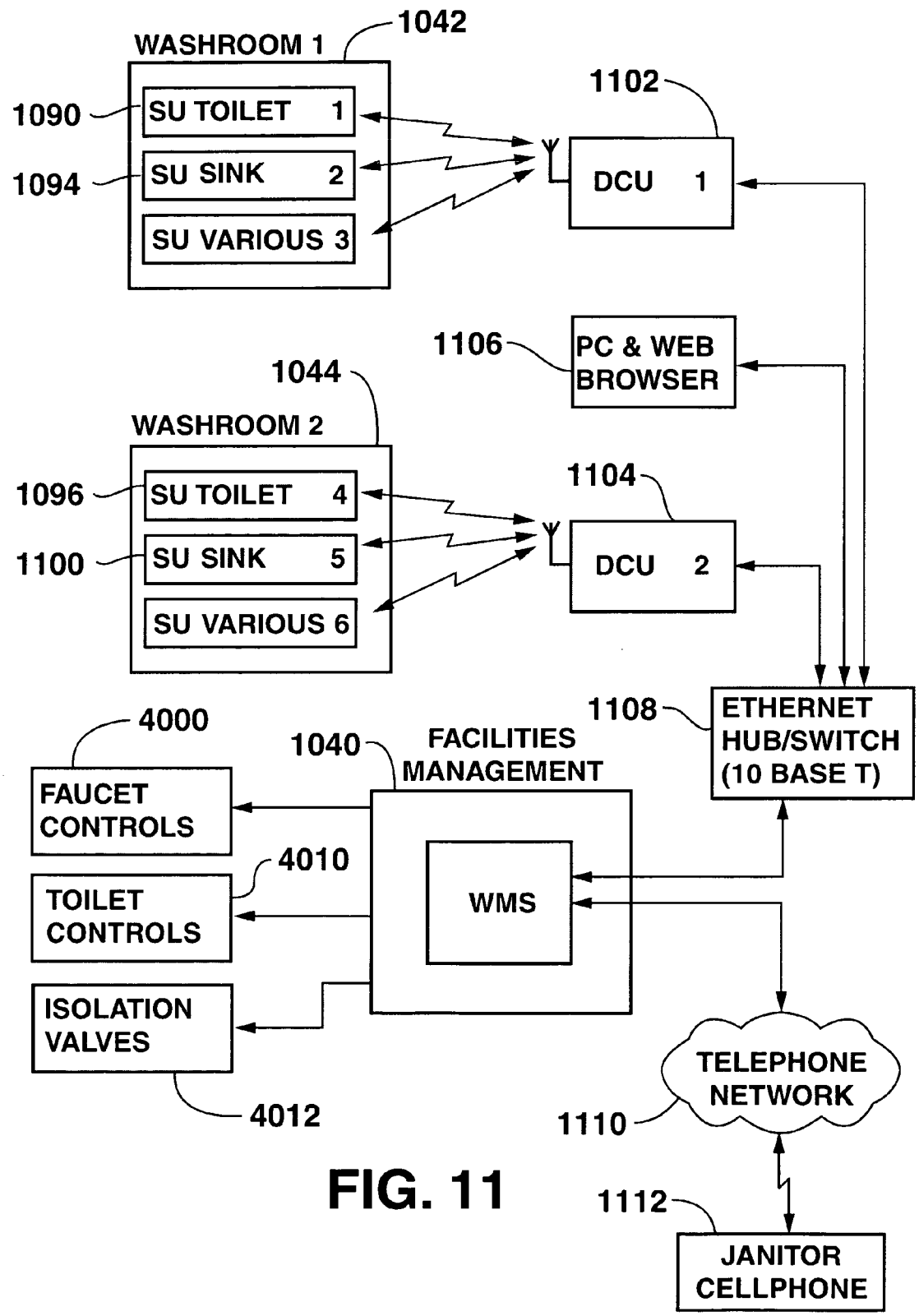
FIG. 11 is a schematic view of an exemplary relationship between toilet and sink overflow or water sensor units, data communication units, a washroom monitoring station, and other components in accordance with an exemplary embodiment of the invention.

FIG. 11 is similar to FIG. 3 discussed above, and includes a communication link between the WMS 1040 and the control circuitry for automatic faucets 4000, automatic toilets 4010, and remotely controlled isolation valves 4012. This link may be wired or wireless. Any one of the sensor units 1090 through 1100 may indicate that a particular toilet or sink is about to overflow, or has already overflowed. In addition to providing an appropriate alert of such condition as discussed above, the WMS 1040 may also initiate automatic deactivation of the subject fixture to stop the overflow condition from worsening. The monitored washroom may also be provided with remotely controlled isolation or supply valves, such as solenoid-actuated valves, that can also be actuated by the WMS 1040 in response to an alert condition. Such a valve may be provided for each fixture, or a single valve may be assigned to a plurality of fixtures.

Figure 8:
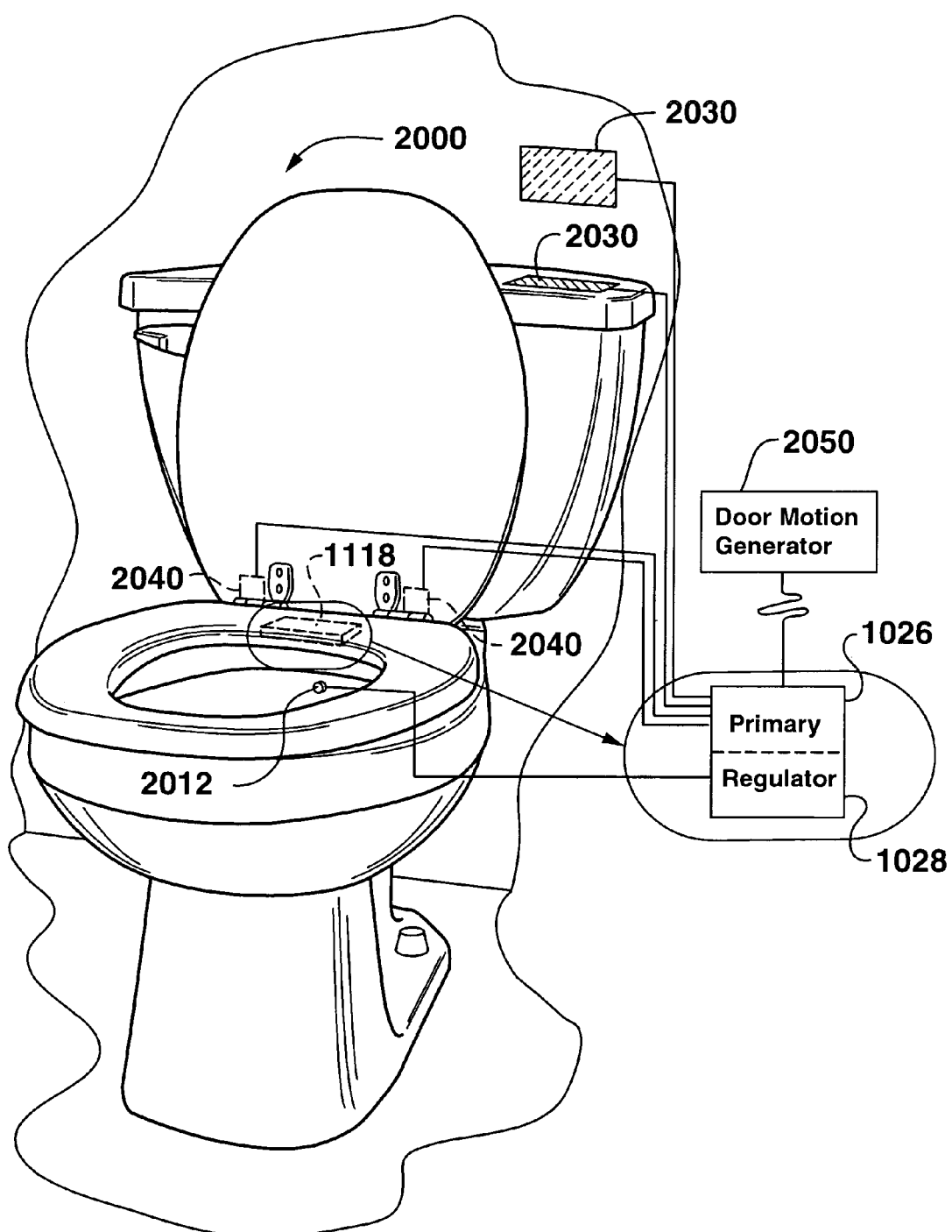
FIG. 8 is a conceptual illustration of a power supply scheme for the toilet of FIGS. 6A and 6B.

As discussed above with respect to FIG. 4, the SU 1014 (overflow sensor 1118) is supplied with power by an appropriate power supply circuit 1029, which may include a primary power source, such as a battery or a building's main power system (that may be converted from AC to DC), and a backup power source. FIG. 8 conceptually illustrates an embodiment of various power supply schemes wherein the sensor arrangement of FIG. 6A is supplied with a primary and backup power source. In this embodiment, the sensor electronics package 1118 is remote from the detector 2012. If the detector 2012 is in wireless communication with the package 1118, then power must be separately supplied to the detector 2012 and the package 1118. The same or different power sources may be used for this purpose. If the detector 212 and package 1118 are in wired communication, then power may be supplied to the detector 212 via the package 1118, as illustrated in FIG. 4. The power circuitry 1029 may be configured as an integral feature of the sensor electronics package 1118, including a primary battery or connection to a building's main power system, or may be remotely located from the package 1118 and wired to the package and detector 2012.

In the embodiment of FIG. 8, one or more solar (photovoltaic) generating panels 2030 are used to supply power to the circuitry 1029. The panels 2030 may be located at any desired location to react to light within the washroom, for example on top of the toilet tank, on a wall, and so forth. Photovoltaic panels are well known in the art, and any number of commercially available devices may be used. The panels may generate power as a primary source for the circuitry 1029, or as a backup source in event of failure of the primary source. The panels 2030 may also be used to provide a continuous (as long as light is available) trickle charge to a primary rechargeable battery.

An alternate power source may be generated by motion of any number of devices within the restroom, such as hinges configured with stall doors, toilet covers and seats, and the like. For example, relatively small dynamos may be configured with the hinges and used to generate power each time the attached door or other object is moved. The present applicants believe that suitable devices are being developed and are referred to in the art as Micro Electro Mechanical Systems (MEMS). Electronic components such as watches, portable lights, and the like are know that are powered by motion or movement of the devices through an internal generator sometimes referred to as a "kinetic" power source. These kinetic power sources may also be configured for powering an overflow sensor. Such devices are conceptually illustrated in FIG. 8 as motion generators 2040 configured with the toilet cover hinges. Motion generators 2050 may also be configured with stall doors, cabinet doors, and so forth. The generators 2040, 2050 may be connected to a capacitor circuit or directly to a rechargeable battery via a rectifier circuit to utilize the power generated by movement of the cover or door.

Advances are also being made in the field of micro batteries, and such miniature batteries may provide a source of primary or backup power to overflow sensors 1118 used in a monitoring system according to the present invention. For example, micro batteries are known that are powered by a radioisotope source within the battery.

It should be appreciated that any of the power schemes described herein are applicable to any of sensor unit configurations, including the overflow and water sensor unit configurations described herein.

As discussed above, despite best efforts to monitor for overflow conditions, overflows may still occur undetected and result in water on the washroom facility floor. Water or wetness may also result from leaks, breaks in supply lines, vandalism, condensation, and any other source. Such conditions are not safe, and may be monitored for with a washroom monitoring system according to the invention.

Figure 10:
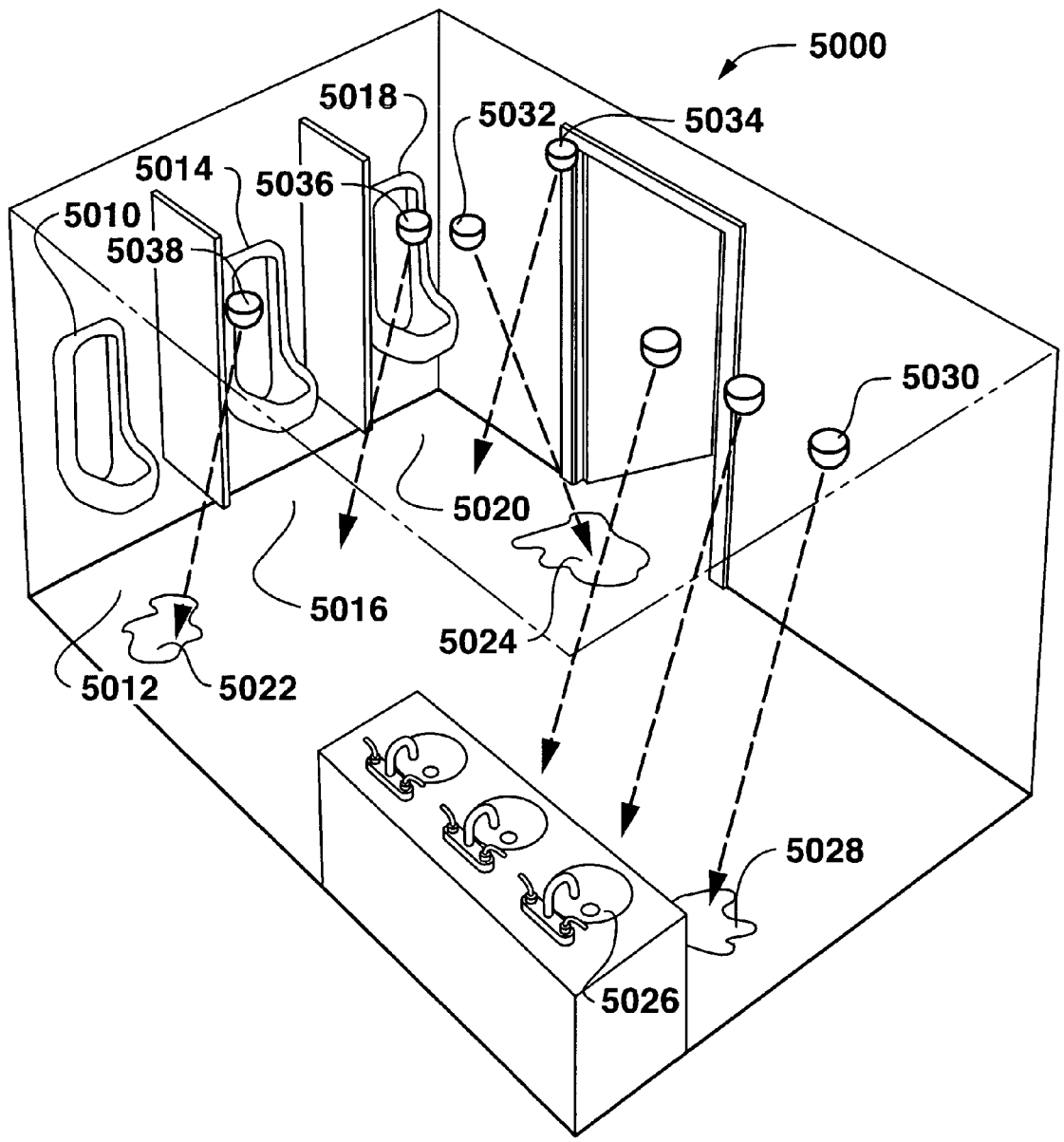
FIG. 10 is a conceptual illustration of an embodiment for monitoring for water or moisture on a floor of a monitored washroom according to the invention.

One embodiment for detecting wetness or standing water on the floor of a washroom facility is depicted in FIG. 10. In this embodiment, the washroom 5000 includes a number of toilet fixtures 5010, 5014, 5018 and sink fixtures 5026. It is assumed that water form a leak or overflow from these fixtures will accumulate on the floor in the area adjacent or underneath of the fixtures. These areas are designated as monitored areas 5012, 5016, 5020, and 5028. Other areas of interest may also be monitored, such as the area 5024 adjacent to the door of the washroom 5000. Water sensors are provided to "view" the monitored areas and detect an abnormal amount of water that may be present, regardless of the source. The water sensors may be mounted in the ceiling, in walls, or any other convenient location where a line-of-sight view is provided to the monitored areas. In the illustrated embodiment of FIG. 10, a plurality of the water sensors 5038, 5036, 5032, 5034, and 5030 are disposed in or on the ceiling to look down towards the monitored areas.

In a particular embodiment of the water sensors, a temperature-sensing device reacts to changes in the heat signature of a monitored area as a result of introduction of wetness to the area, such as the water 5022 in the monitored area 5012, or the water 5024 at the entrance to the washroom 5000. Various temperature sensors may be utilized in this regard. In a particular embodiment, the sensor is an infrared sensor. If the measured temperature fluctuates above a threshold value for a defined period of time, an alarm signal is generated by the washroom monitoring station to indicate the likely presence of water in the monitored area. Preferably, the sensor is automatically calibrated with expected changing conditions that may cause temperature fluctuations, such as the HVAC system. The sensor is also calibrated so as not to alarm under normal operating conditions, such as a patron shaking water off of their hands after washing.

Temperature monitoring sensors that may be configured for use with a system according to the present invention are described, for example, in U.S. Pat. Nos. 4,800,278 and 4,514,631; EP 0113069; and EP 1384978.

As with the embodiment of FIG. 9, the electronic control package components of the water sensors 5038, . . . may be remotely located from the transmitter and receiver components, and may be in wired or wireless communication therewith. In an alternate embodiment, the sensors 5038, . . . are a complete integral package. Also, a dedicated sensor 5038, . . . may be provided for each monitored area 5012, or one such sensor may be configured to monitor a plurality of areas.

Figure 12:
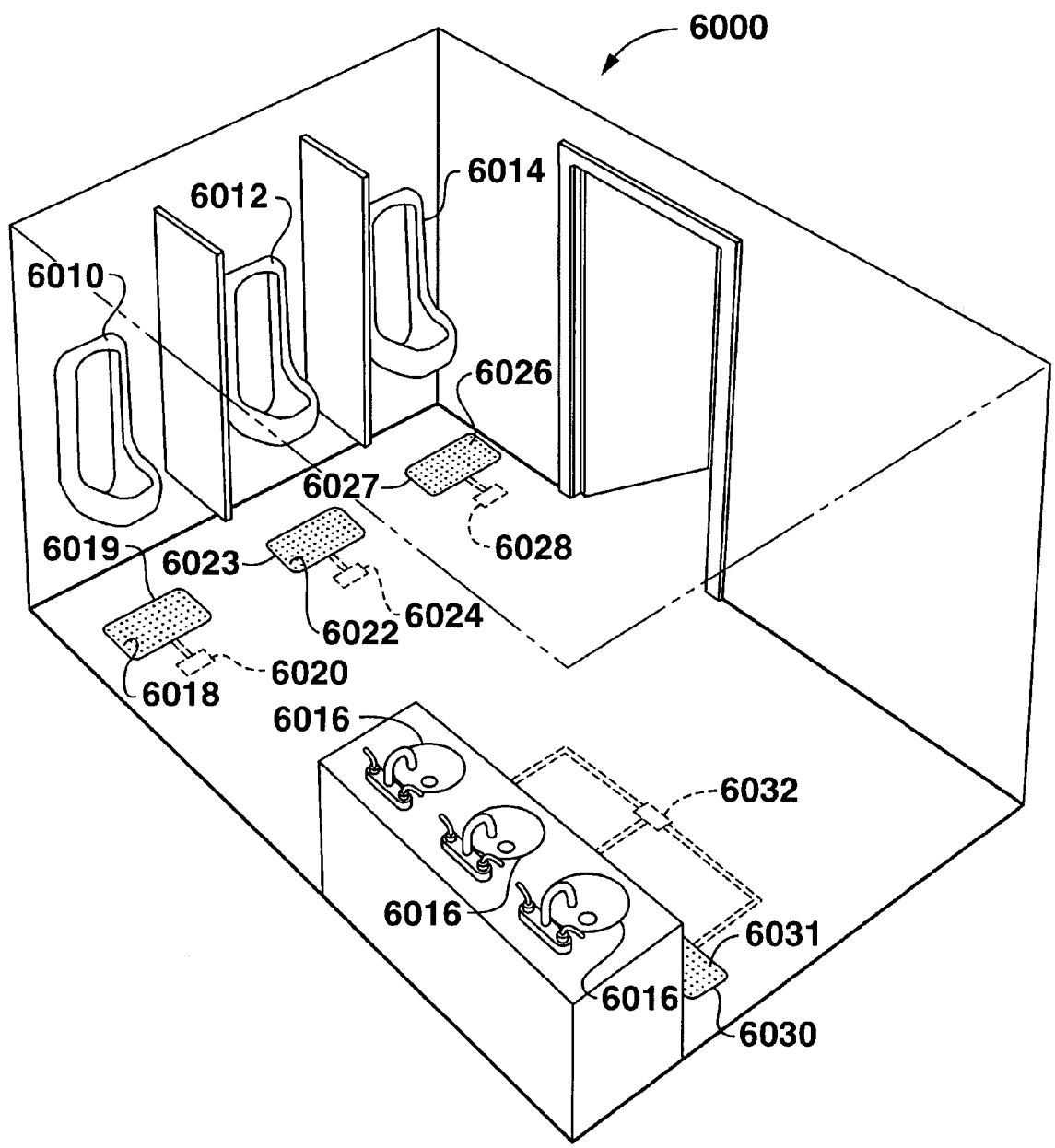
FIG. 12 is a conceptual illustration of an embodiment for monitoring for water or moisture on a floor of a monitored washroom according to the invention.

FIG. 12 depicts another embodiment for monitoring certain areas of a washroom 6000 for wetness. In this embodiment, devices are disposed in the monitored areas 6018, 6022, 6028, 6030 to detect changes in electrical characteristics of conductive members resulting from water being introduced into the monitored areas. In an exemplary embodiment, each monitored area 6018, . . . includes an array or pattern 6019, 6023, 6027, 6031 of electrically conductive members that react to water in the area. For example, the conductive members may define a completed circuit if water or moisture bridges between the members. Sensor electronic packages 6020, 6024, 6028, 6032 associated with the conductive members to detect the completed circuit and communicate an alarm signal to the washroom monitoring station, as discussed above. Alternatively, the conductive members may define a completed circuit that is shorted by water or moisture. The respective sensor electronic packages detect the short and communicate an alarm signal to the washroom monitoring station.

The conductive members preferably operate in a voltage range that poses no risk to persons that may contact the members, or step in water in the monitored areas. A range of about 1 to 5 Vdc may be acceptable.

It should be appreciated that various configurations of conductive materials or members may be used to create the monitored areas, and that any combination of electrical characteristics may be monitored. For example, conductive loops of material (e.g., wire) may define a perimeter of a monitored area around the base of a toilet fixture, or adjacent to a sink area. The conductive material may be formed directly into the floor material and exposed at the upper surface of the floor material such that water bridging between any two points on the loop creates a short that is detected by the sensor unit. The conductive members may be used to create an attractive floor design, or be arranged into an existing floor design so as to be indistinguishable therefrom. In an alternate configuration, pads or mats incorporating any pattern of conductive members may be placed on the washroom floor at any desired location, as illustrated in FIG. 12. This embodiment may be desired in that the pads are portable and replaceable, and may also be used in existing washroom facilities. The pads may include an electrically insulating base material with a grid or pattern of conductive members disposed thereon.

The pads or other conductive member arrangements 6019, . . . include respective sensor unit control packages 6020, 6024, 6028, 6032 that also supply power to the conductive members at a continuous or fixed frequency. As mentioned, depending on the sensing principle, the control packages 6020 may detect any combination of electrical characteristics that are changed by introduction of water into the monitored area. Each pad or other conductive member arrangement 6019, . . . may have a dedicated sensor control package 6020, as illustrated with the pads beneath the toilets 6010, 6012, 6014, or a single control package 6032 may be configured to cycle through a plurality of pads 6031, as illustrated with the pads adjacent the sinks 6016. The control packages are all in communication with a WMS, as discussed above.

The WMS may implement control logic circuitry or algorithms to detect the location of the detected water, flow rate, or direction of travel of water on the floor as a function of the sequence and timing of alerting pads or other devices in the monitored areas.

Figure 13:
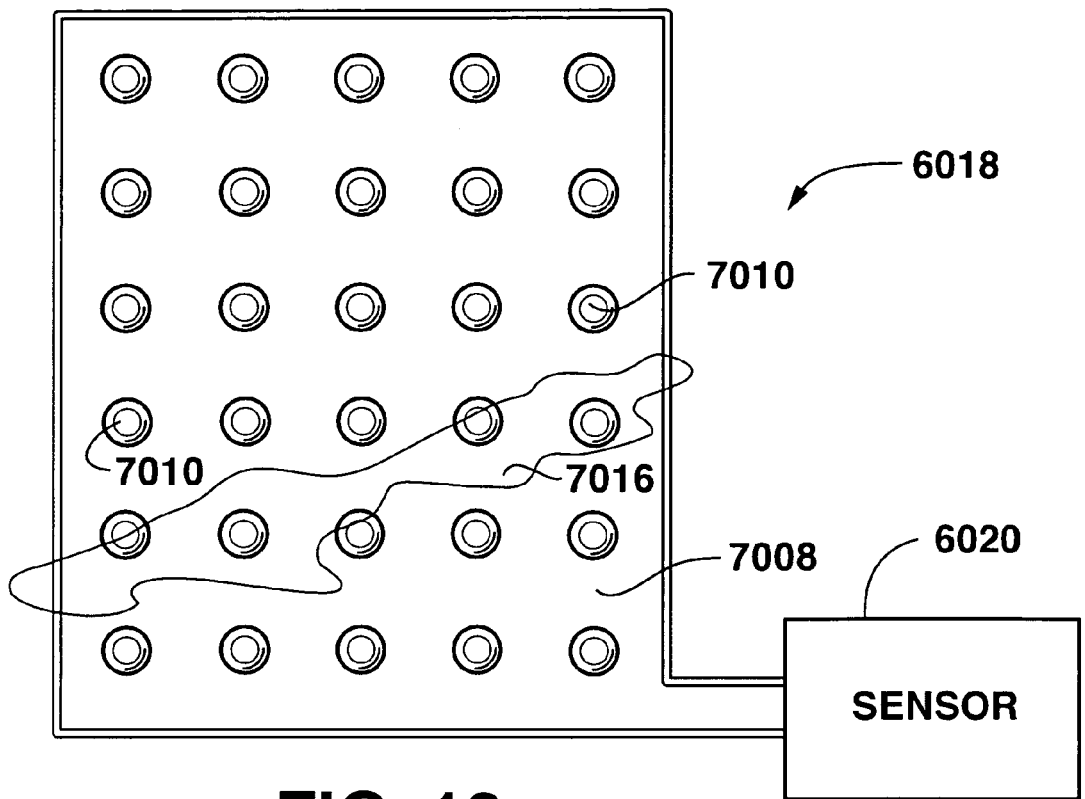
FIG. 13 is a perspective view of a water sensor pad that may be used in the water monitoring system illustrated in FIG. 12.
Figure 14:
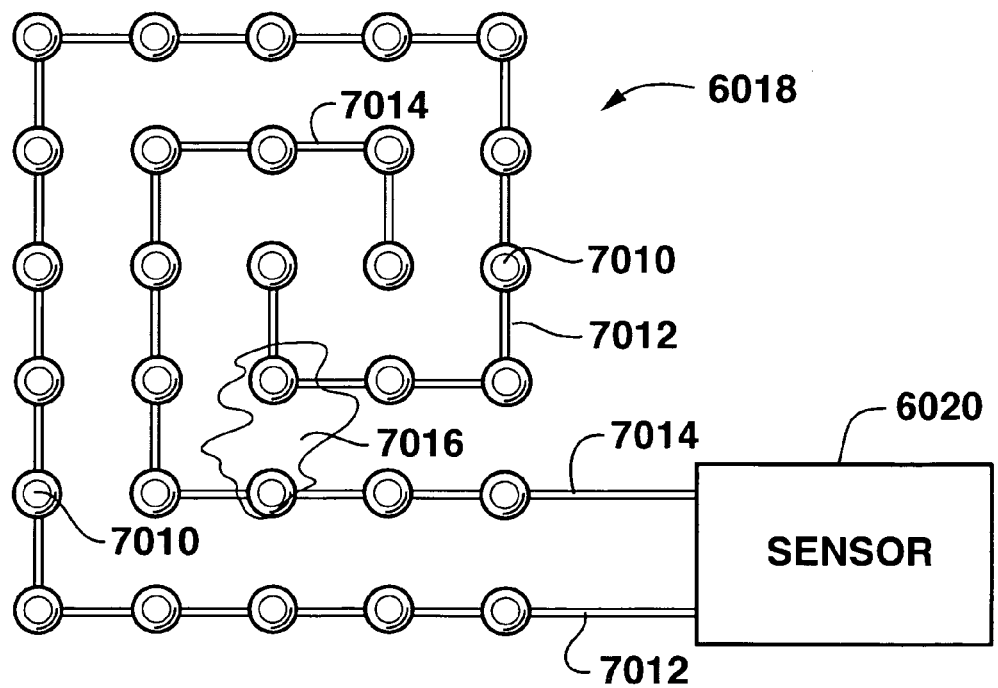
FIG. 14 is a perspective view of an alternate embodiment of a water sensor pad.
Figure 15:
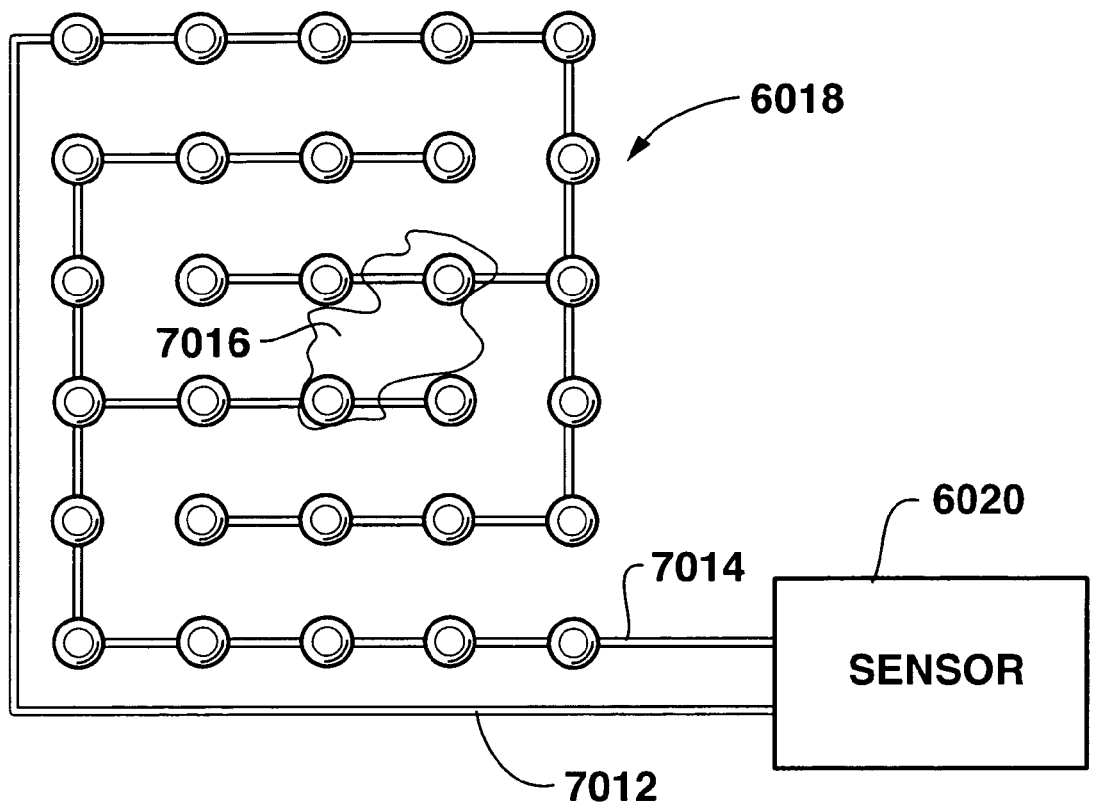
FIG. 15 is a perspective view of an alternate embodiment of a water sensor pad.

Referring to FIGS. 13 through 15, in a particular embodiment, the monitored areas 6018 incorporate a grid-like pattern of conductive members 7012, 7014, 7010. In the illustrated embodiments, the grid includes a pattern of exposed conductive polymeric beads 7010 arranged in a symmetrical pattern or as part of any desired surface pattern, including a logo or emblem. The "beads" may be any formation of distinct conductive material. In the particular embodiments of FIGS. 14 and 15, the beads 7010 are electrically linked or connected along distinct open circuit legs 7014, 7012 of a circuit that is supplied with power from the sensor package 6020. The beads 7010 may be electrically connected by any suitable conductive material, with at least the beads remaining exposed on the floor surface. The conductive links between the beads may be formed in the floor material, or in an insulated mat or pad. With these embodiments, if sufficient water 7016 is introduced into the monitored area 6018 such that the water bridges the gap between the beads 7010 of adjacent legs of the open circuit, a completed circuit is formed and detected by the sensor package 6020. Various pattern designs of the beads 7010 may be used for this purpose, and the designs of FIGS. 13 and 14 are illustrative only.

It should be appreciated that operation of the embodiments of FIGS. 13 and 14 do not depend on the use of conductive beads, but may use any conductive members or material to define open circuit legs. For example, the legs 7014 and 7012 may be defined by continuous threads of exposed conductive material, such as a conductive polymer, wire, and so forth.

In an alternate embodiment of FIG. 13, a conductive plate, pad, or other conductive material 7008 is supplied with power from sensor package 6020. Any desired pattern of conductive beads 7010 are connected to the material 7008 and are exposed at the upper surface of the monitored area. The material 7008 may be formed into the floor material, or be a layer in an insulated pad or mat. Water 7016 crossing between any of the beads 7010 will complete a circuit between the beads and change a monitored electrical characteristic of the overall circuit that is detected by the sensor package 6020.

It should be appreciated that the beads 7010 in any embodiment may serve other purposes, such as identifying the extent of the monitored area, providing a non-slip surface in the monitored areas, displaying an aesthetic design or logo, and so forth.

In a particular embodiment, the beads 7010 are formed at least in part with a conductive polymer material, such as ceramic beads coated with conductive polymers. In another embodiment, the beads are formed entirely of an inherently conductive polymer, or conductive filled polymer. Examples of filled polymers include carbon black (amorphous or nano crystals), silver, aluminium, etc., dispersed in the form of fibres, flakes, beads, or needles in a thermoplastic material, and also reticulated organic crystalline materials like tetrathiafulvalent (TTF) and tetracynoquinodimethane (TCNQ) and their block copolymers. Examples of inherently conductive polymers include polyacetylene, polypyrrole, polythiophene, polyphthalocyanines, polyphenylvinylene, polyphenylsulfide, polyaniline, and so forth.

As with other embodiments, the detection threshold of the sensor package 6020 associated with the conductive members is adjustable and calibrated so as not to alarm under normal operating circumstances, including normal temperature and humidity conditions.

As with the overflow sensors, the water or wetness sensors may also be integrated with automatic fixture controls or isolation valves through the washroom monitoring station.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A system for detecting an actual or impending overflow condition from washroom fixtures in a washroom, comprising:
   a plurality of automatically actuated washroom fixtures having associated control circuitry, said automatically actuated washroom fixtures automatically actuated by detection of a patron;
   an overflow sensor configured with each said fixture at a location to detect an abnormal rise in water level within said fixture before water overflows said fixture;
   a data communications unit in wireless communication with said overflow sensors, said data communications unit configured to receive and process signals from said overflow sensors, wherein said communication with said overflow sensors is bi-directional permitting reprogramming, adjusting, or controlling operational parameters of said overflow sensors;
   a washroom monitoring station in communication with said data communications unit and in communication with said overflow sensors through said data communications unit, wherein said washroom monitoring station is configured for receiving and processing alerts or alarm conditions from said overflow sensors and indicating the presence of water when detected by said overflow sensors;
   said fixtures comprising a plurality of automatically actuated toilet and automatically actuated sink fixtures with a respective said overflow sensor associated with each of said fixtures, each said overflow sensor identified by a unique identification tag at said washroom monitoring station:
   said washroom monitoring station in communication with said control circuitry for said fixtures to disable said fixtures upon detection of an overflow condition;
   wherein said washroom includes multiple remotely actuated isolation valves with associated control circuitry in a water supply line to said fixtures, said washroom monitoring station in communication with said control circuitry for each said isolation valve, wherein upon detection of an overflow condition by an overflow sensor with unique identification tag, the isolation valve associated with the fixture with an overflow condition automatically closes.

2. The system as set forth in claim 1, wherein said overflow sensor comprise a detector, a power supply, and communications electronics, said detector located remotely from said power supply and control electronics.

3. The system as set forth in claim 1, wherein said overflow sensor configured with said toilets comprises a detector located to detect an abnormal rise in water within a toilet bowl, and communications electronics configured with a toilet seat for each said toilet.

4. The system as set forth in claim 3, wherein said communications electronics are embedded within a toilet seat.

5. The system as set forth in claim 1, further comprising a solar panel configured for delivering power to said overflow sensor, said solar panel generating power responsive to light conditions within the washroom, said solar panel providing a trickle charge to a battery power source or primary power during lighted conditions within the washroom.

6. The system as set forth in claim 1, wherein said overflow sensor comprises a UWB detector disposed to detect water level through a receptacle wall of said fixture.

7. The system as set forth in claim 1, wherein said overflow sensor comprises a tuned radio frequency oscillator circuit that generates a detectable shift in frequency at a predetermined water level within said fixture.

8. The system as set forth in claim 1, wherein said overflow sensor comprises an active transmitter disposed to direct a beam into a water receptacle of said fixture, said overflow sensor detecting a height of water within said receptacle as a function of a characteristic of the reflected beam from the water.

9. The system as set forth in claim 8, wherein said active transmitter is configured to remain in a rest mode until activated by a trigger signal in response to a detected activity in the washroom.

10. The system as set forth in claim 1, wherein said washroom monitoring station is configured to transmit alerts to a portable source.

11. The system as set forth in claim 10, wherein said portable source is selected from the group consisting of a PDA, cell phone, pager, telephone, email, or combinations thereof.

12. The system as set forth in claim 1, further including a web server in communication with the data communications unit.

13. The system as set forth in claim 12, wherein the web server permits remote connection via the internet to access system information.

* * * * *